(12) United States Patent
Mann

(10) Patent No.: US 11,015,830 B2
(45) Date of Patent: May 25, 2021

(54) DEVICE USING PROJECTOR FOR DISPLAY

(71) Applicant: Johnson Controls Technology Company, Auburn Hills, MI (US)

(72) Inventor: Joseph Mann, Waukesha, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 39 days.

(21) Appl. No.: 16/195,225

(22) Filed: Nov. 19, 2018

(65) Prior Publication Data

US 2020/0158366 A1 May 21, 2020

(51) Int. Cl.

| | |
|---|---|
| *F24F 11/523* | (2018.01) |
| *H05B 47/11* | (2020.01) |
| *F21V 8/00* | (2006.01) |
| *G09G 5/02* | (2006.01) |
| *F24F 11/56* | (2018.01) |
| *F24F 11/64* | (2018.01) |
| *G09G 5/10* | (2006.01) |
| *G09G 3/00* | (2006.01) |

(52) U.S. Cl.
CPC ............ *F24F 11/523* (2018.01); *F24F 11/56* (2018.01); *F24F 11/64* (2018.01); *G02B 6/0001* (2013.01); *G09G 5/02* (2013.01); *G09G 5/10* (2013.01); *H05B 47/11* (2020.01); *G09G 2360/144* (2013.01)

(58) Field of Classification Search
USPC ....................................................... 345/207
See application file for complete search history.

(56) References Cited

U.S. PATENT DOCUMENTS

| | | | |
|---|---|---|---|
| 6,556,258 B1* | 4/2003 | Yoshida ............... | G02B 6/0055 349/61 |
| 7,317,970 B2 | 1/2008 | Pienta et al. | |
| 2003/0136853 A1* | 7/2003 | Morey ................... | F23N 5/203 236/46 R |
| 2006/0034579 A1* | 2/2006 | Sugiura ................ | G02B 6/0028 385/146 |
| 2011/0242054 A1 | 10/2011 | Tsu | |
| 2015/0253929 A1 | 9/2015 | Li et al. | |
| 2016/0180780 A1* | 6/2016 | Chen ..................... | G09G 3/3413 345/207 |
| 2016/0209928 A1 | 7/2016 | Raja et al. | |
| 2016/0327298 A1* | 11/2016 | Sinha ....................... | F24F 11/30 |
| 2017/0074541 A1* | 3/2017 | Bentz .................. | G06F 3/04847 |
| 2017/0234562 A1* | 8/2017 | Ribbich ............. | G05D 23/1923 700/277 |
| 2018/0003994 A1* | 1/2018 | Grey ................... | G02B 27/0101 |
| 2018/0059520 A1* | 3/2018 | Dubois ................ | H03K 17/962 |
| 2018/0067575 A1* | 3/2018 | Hong ..................... | G06F 3/042 |

(Continued)

*Primary Examiner* — Chineyere D Wills-Burns
(74) *Attorney, Agent, or Firm* — Foley & Lardner LLP

(57) ABSTRACT

A controller configured to provision on a surface of an environment includes a projector configured to project light for a user interface through an opening in the surface, wherein the projector is located on a first side of the surface. The controller includes a waveguide located within the opening of the surface, wherein the waveguide is configured to transmit the light from the projector through the opening in the surface. The controller further includes a direction element located on a second side of the surface, wherein the direction element is configured to direct the light from the projector to a user.

14 Claims, 13 Drawing Sheets

(56) References Cited

U.S. PATENT DOCUMENTS

| | | | |
|---|---|---|---|
| 2018/0120559 A1* | 5/2018 | Yeoh | G02B 5/3083 |
| 2018/0173949 A1* | 6/2018 | Jeong | G06K 9/00255 |
| 2018/0225934 A1* | 8/2018 | Moulton | F24F 11/61 |
| 2018/0275394 A1* | 9/2018 | Yeoh | G02B 26/004 |
| 2020/0105224 A1* | 4/2020 | Higashiyama | H04N 9/3155 |

* cited by examiner

DEVICE USING PROJECTOR FOR DISPLAY

BACKGROUND

The present disclosure relates generally to thermostats for heating, ventilation, and air conditioning (HVAC) systems. The present disclosure relates more particularly to user interface of the thermostats.

A building can include an HVAC system, airside system including an air handler unit (AHU), multiple variable air volume units (VAVs) associated with various zones, residential heating or cooling units, and a thermostat configured to control the residential heating or cooling units, the AHU, and/or the VAVs. The thermostat can be configured to regulate the air temperature of the zones by modifying the control of heating and cooling in the zones. A thermostat often includes a display allowing user interaction. The display of a thermostat is often exposed and subject to damage. A thermostat display resistant to damage may be desirable to improve the life of the device.

SUMMARY

One implementation of the present disclosure is a controller to provision on a surface of an environment. In some embodiments, the controller includes a projector, a waveguide, and a direction element. In some embodiments, the projector is located on a first side of the surface and projects light for a user interface through an opening in the surface. In some embodiments, the waveguide is located within the opening of the surface and transmits the light from the projector through the opening in the surface. In some embodiments, the direction element is located on a second side of the surface and directs the light from the projector to a user.

According to some embodiments, the waveguide transmits the light from the projector through the opening in the surface in a first direction. In some embodiments the direction element directs the light from the projector by redirecting the light in a second direction onto the surface. In some embodiments, the direction element directs the light from the projector by redirecting the light in a second direction onto a diffraction grating. In some embodiments, the diffraction grating directs the light from the direction element by redirecting the light in a third direction to the user. In some embodiments, the direction element directs light from the projector by redirecting the light onto a projection surface. In some embodiments, the projection surface directs the light from the direction element to the user. In some embodiments, the direction element directs light from the projector by redirecting the light in a second direction onto a combiner surface. In some embodiments, the combiner surface directs light from the direction element by redirecting the light in a third direction to the user.

In some embodiments, the controller includes a light sensor to sense an ambient light intensity of the surface. In some embodiments, the controller includes a processing circuit to receive the sensed input value from the light sensor and update a brightness of the user interface based on the ambient light intensity of the surface.

In some embodiments, the controller includes a color sensor to sense a color of the surface. In some embodiments, the controller includes a processing circuit to receive the sensed input value from the color sensor and update a color scheme of the user interface based on the color of the surface.

In some embodiments, the controller includes a processing circuit to receive emergency data associated with an emergency event, determine whether the emergency event exists based on the received emergency data, and update the user interface to include an indication of the emergency event in response to a determination that the emergency event exists. In some embodiments, the processing circuit determines whether a state of the controller is a lock state or an unlocked state, causes the projector to project light from a lock screen in response to a determination that the controller is in the lock state, ignores user inputs from a user input device in response to the determination that the controller is operating in the lock state, receives a credential from the user input device, determines whether the credential grants the user access to the controller, causes the controller to operate in the unlocked state, causes the projector to project light for a control screen, and receives one or more user inputs from the user input device in response to a determination that the credential grants the user access to the controller.

Another implementation of the present disclosure is a thermostat with a projected display for controlling building equipment. In some embodiments, the thermostat includes an input system, a projector, and a processing circuit. In some embodiments, the projector generates a user display from a source element that is located behind a mounting source for the thermostat and presents the user display to a user via at least one of a projection or a waveguide. In some embodiments, the processing circuit receives environmental ambiance input that includes at least one of ambient light intensity or ambient surface color and adapts the user display based on the environmental ambiance input to a different brightness or a different color scheme.

In some embodiments, the thermostat includes a light sensor to sense an ambient light intensity of a surface. In some embodiments, the thermostat includes a color sensor to sense a color of a surface.

In some embodiments, the processing circuit receives the sensed input value from the light sensor and updates a brightness of a user interface based on the ambient light intensity of the surface. In some embodiments, the processing circuit receives the sensed input value from the color sensor and updates a color scheme of a user interface based on the color of the surface. In some embodiments, the processing circuit receives emergency data associated with an emergency event, determines whether the emergency event exists based on the received emergency data, and updates the user display to include an indication of the emergency event in response to a determination that the emergency event exists. In some embodiments, the processing circuit determines whether a state of the thermostat is a lock state or an unlocked state, causes the projector to project light for a lock screen in response to a determination that the thermostat is in the lock state, receives a credential from the user input device, determines whether the credential grants the user access to the thermostat, causes the thermostat to operate in the unlocked state, causes the projector to project light for a control screen, and receives one or more user inputs from the user input device in response to a determination that the credential grants the user access to the thermostat.

Another implementation of the present disclosure is a building management system including one or more climate control units and a thermostat with a projected display. In some embodiments, the thermostat includes an input system, a projector, and a processing circuit. In some embodiments, the projector generates a user display from a source element that is located behind a mounting surface that the thermostat is mounted on and presents the user display to a user via at least one of a projection or a waveguide. In some embodiments, the processing circuit receives environmental ambiance input that includes at least one of ambient light intensity or ambient surface color and adapts the user display based on the environmental ambiance input to a different brightness or a different color scheme.

In some embodiments, the thermostat includes a light sensor to sense an ambient light intensity of a surface. In some embodiments, the thermostat includes a color sensor to sense a color of a surface.

In some embodiments, the processing circuit receives the sensed input value from the light sensor and updates a brightness of a user interface based on the ambient light intensity of the surface. In some embodiments, the processing circuit receives the sensed input value from the color sensor and updates a color scheme of a user interface based on the color of the surface. In some embodiments, the processing circuit receives emergency data associated with an emergency event, determines whether the emergency event exists based on the received emergency data, and updates the user display to include an indication of the emergency event in response to a determination that the emergency event exists. In some embodiments, the processing circuit determines whether a state of the thermostat is a lock state or an unlocked state, causes the projector to project light for a lock screen in response to a determination that the thermostat is in the lock state, receives a credential from the user input device, determines whether the credential grants the user access to the thermostat, causes the thermostat to operate in the unlocked state, causes the projector to project light for a control screen, and receives one or more user inputs from the user input device in response to a determination that the credential grants the user access to the thermostat. In some embodiments, the credential is received from at least one of a wearable pendant, a smart phone, a smart watch, or a tablet.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
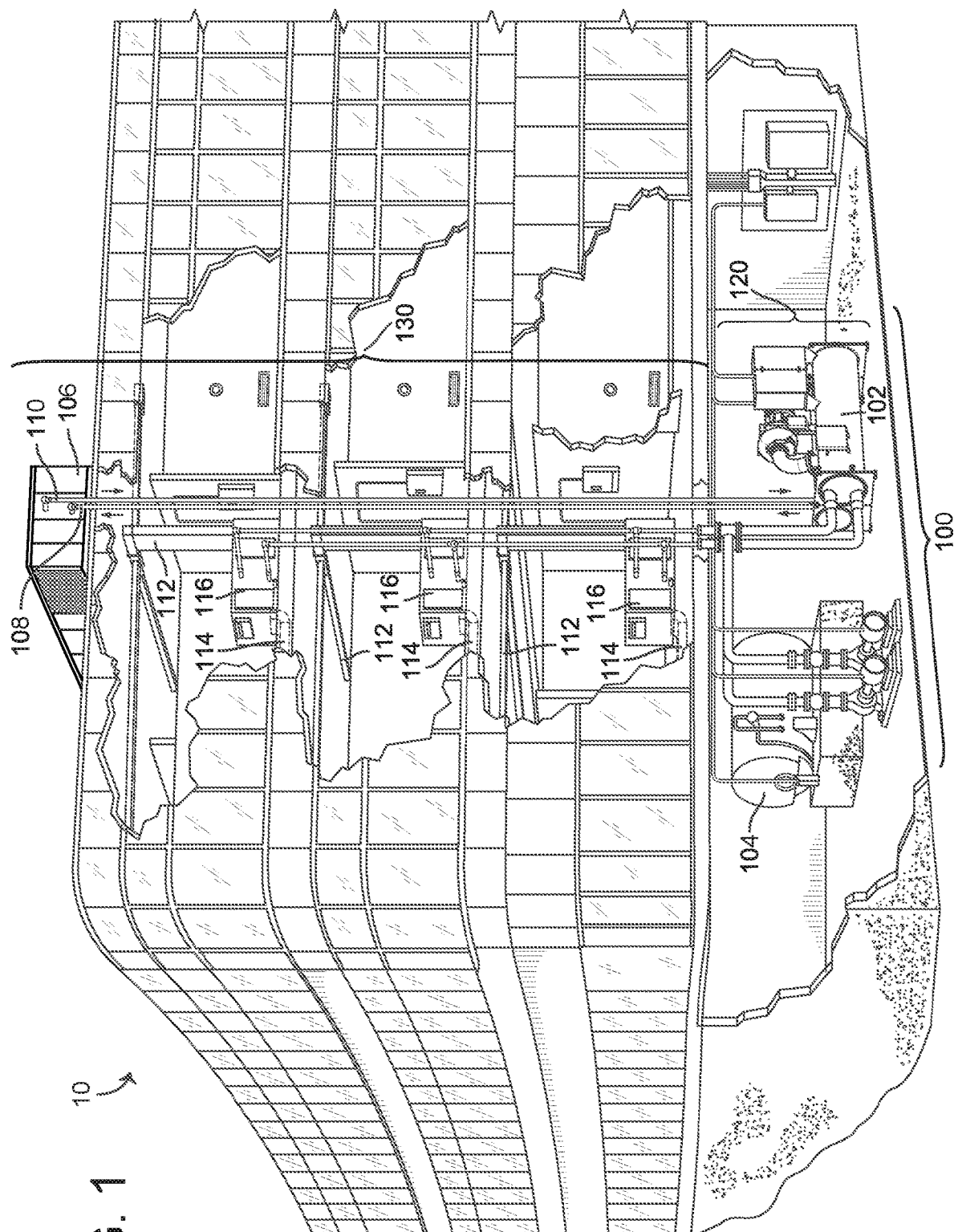
FIG. 1 is a drawing of a building equipped with an HVAC system, according to an exemplary embodiment.

Referring generally to the FIGURES, systems and methods for a device using a projected display are shown, according to various exemplary embodiments. In a building, various zones may be defined where environmental conditions of each zone are controlled by building equipment located in the zone or otherwise associated with the zone. For example, in the building, an air handler unit (AHU) may heat or cool air for the entire building. In each zone, an HVAC system can regulate the environmental conditions where a thermostat can control the HVAC to heat or cool the zone.

The thermostat can control the HVAC system by sending electrical signals to the system and/or opening and/or closing switches. The thermostat can measure the environmental conditions of a zone through one or more sensors and use the measurements to determine the deviation in the environmental conditions from a set point and control signals sent to the HVAC system. The set point of a thermostat can be configured by a user through an interface. The interface of a thermostat generally takes the form of a touch-sensitive display. The touch sensitive display of a thermostat is generally exposed and susceptible to damage. A thermostat with a protected display interface is therefore desirable. A thermostat using a projector for display can include a source display. The source display is an optical light producing element that produces the image of the display interface. The thermostat with a projected display can include a waveguide to direct the image produced by the source display onto a projection medium. The projection medium provides for the user to view the image produced by the source display.

In some embodiments described herein, a thermostat using a projector for display displays the source image using various projection mediums. In some embodiments, the projection medium is configured to be a removable or retractable display surface. A removable or retractable display surface may be lower cost and less susceptible to damage than a traditional display interface. In some embodiments, it is advantageous to implement the projection medium using a fixed, non-removable non-retractable, surface (e.g., rear projection, projecting onto a wall, recombiner projection, relief waveguide, etc.). A thermostat using a projector for display can offer many advantages over traditional display interfaces. A thermostat using a projector for display can position the source display as to be less susceptible to damage as compared with traditional thermostat displays. A more robust display interface can improve the lifespan of the thermostat. Additionally, a thermostat using a projector for display can project a display interface of various sizes without changing the form factor of the thermostat unlike a thermostat utilizing a traditional display interface which is limited by the size of the thermostat. By way of example, a larger thermostat display can be useful for the vision impaired or the elderly who have difficulty interpreting the display interface of a thermostat utilizing a traditional display interface. Similarly, a thermostat using a projector for display may take a smaller form factor and therefore be less obtrusive than a thermostat utilizing a traditional display interface. Furthermore, a thermostat using a projector for display can be located behind furniture such as a book case and project the display to a different visible projection medium. Accordingly, a thermostat using a projector for display may be completely concealed while maintaining a user display interface unlike a thermostat using a traditional display interface.

The thermostat using a projector for display can also dynamically adjust the color and intensity of the display interface. The thermostat can measure the ambient light intensity of an environment and adjust the display intensity accordingly. By way of example, the projected display of the thermostat may be brighter, providing more display contrast and visibility.

In some embodiments, the thermostat using a projector for display can be configured to integrate with other systems. For example, the thermostat can be configured to communicate with a fire detection system or severe weather alert system to provide the user with emergency alerts and information. For example, the thermostat could receive a fire alarm alert from a fire detection system and provide evacuation information, via the projected display medium, to a user.

Building Management System and HVAC System

Figure 2:
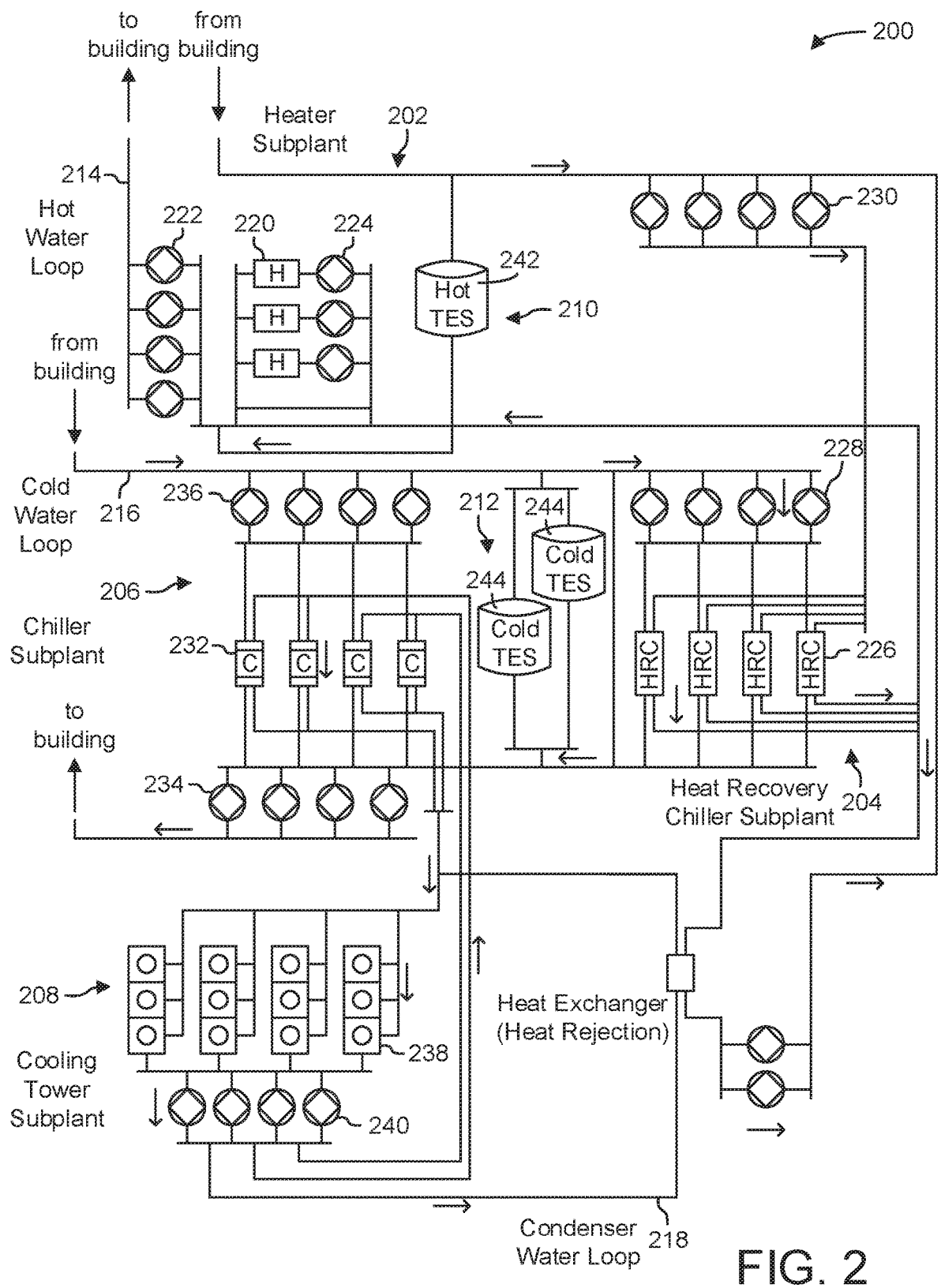
FIG. 2 is a block diagram of a waterside system that may be used in conjunction with the building of FIG. 1, according to an exemplary embodiment.
Figure 3:
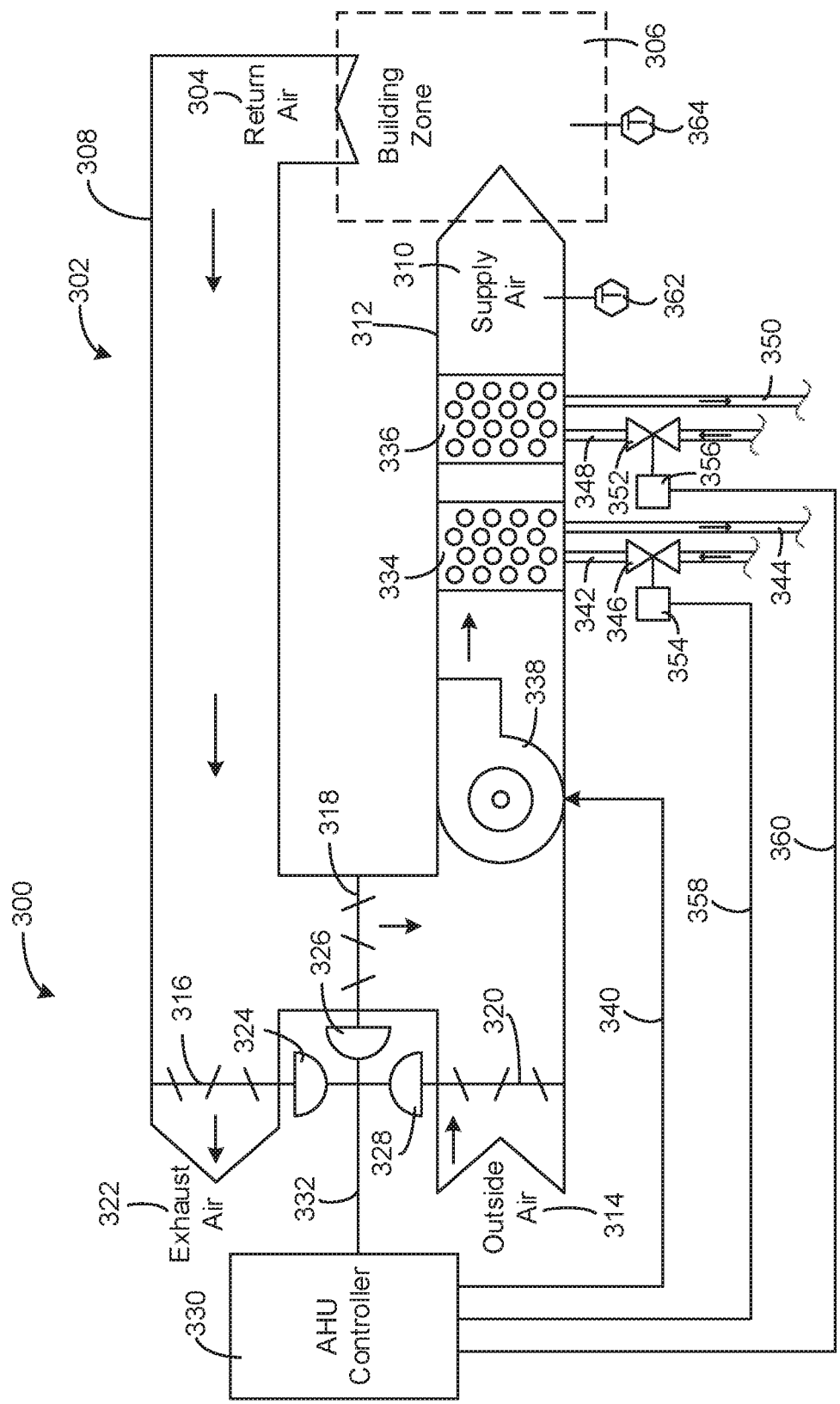
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In some embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In some embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
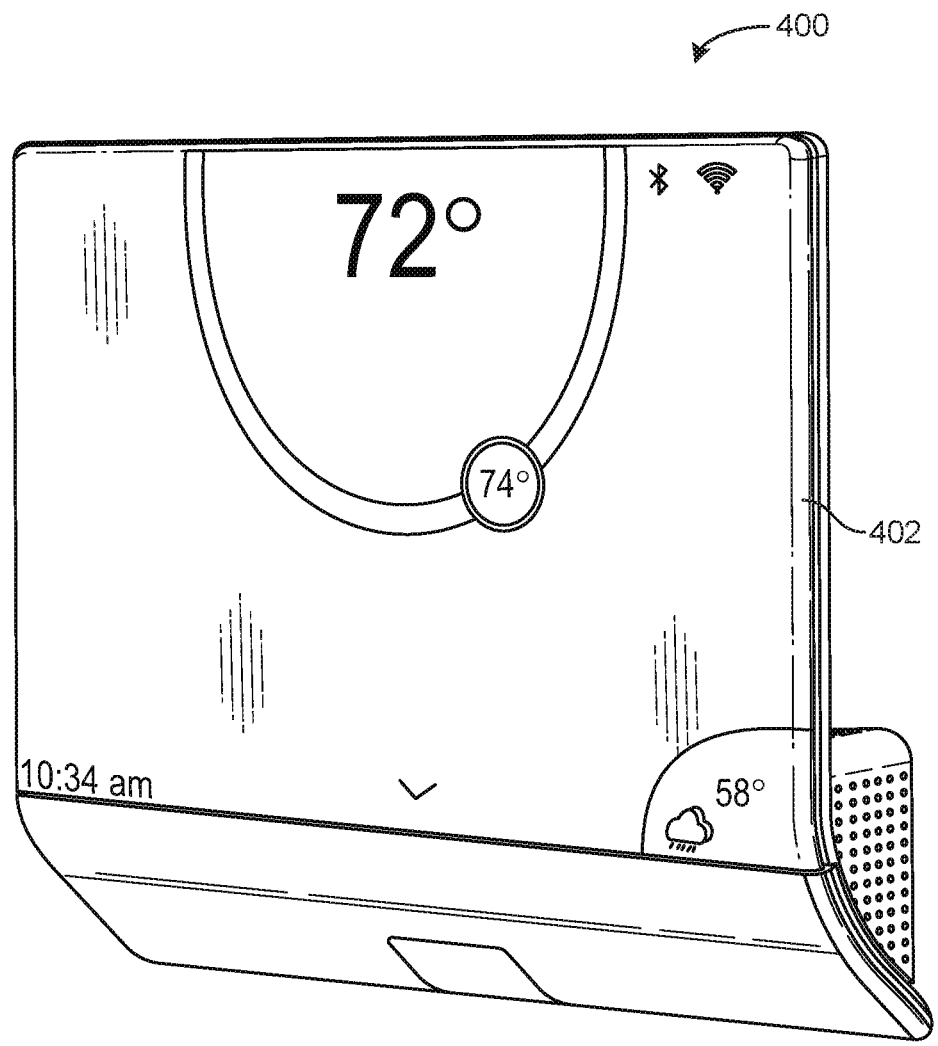
FIG. 4 is a drawing of a cantilevered thermostat with a transparent display that may be used to control the HVAC system of FIG. 1, according to an exemplary embodiment.

Referring now to FIG. 4, a drawing of a thermostat 400 for controlling building equipment is shown, according to an exemplary embodiment. The thermostat 400 is shown to include a display 402. The display 402 may be an interactive display that can display information to a user and receive input from the user. The display may be transparent such that a user can view information on the display and view the surface located behind the display. Thermostats with transparent and cantilevered displays are described in further detail in U.S. patent application Ser. No. 15/146,649 filed May 4, 2016, the entirety of which is incorporated by reference herein.

The display 402 can be a touchscreen or other type of electronic display configured to present information to a user in a visual format (e.g., as text, graphics, etc.) and receive input from a user (e.g., via a touch-sensitive panel). For example, the display 402 may include a touch-sensitive panel layered on top of an electronic visual display. A user can provide inputs through simple or multi-touch gestures by touching the display 402 with one or more fingers and/or with a stylus or pen. The display 402 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of display 402 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the display 402 is configured to present visual media (e.g., text, graphics, etc.) without requiring a backlight.

Residential HVAC System

Figure 5:
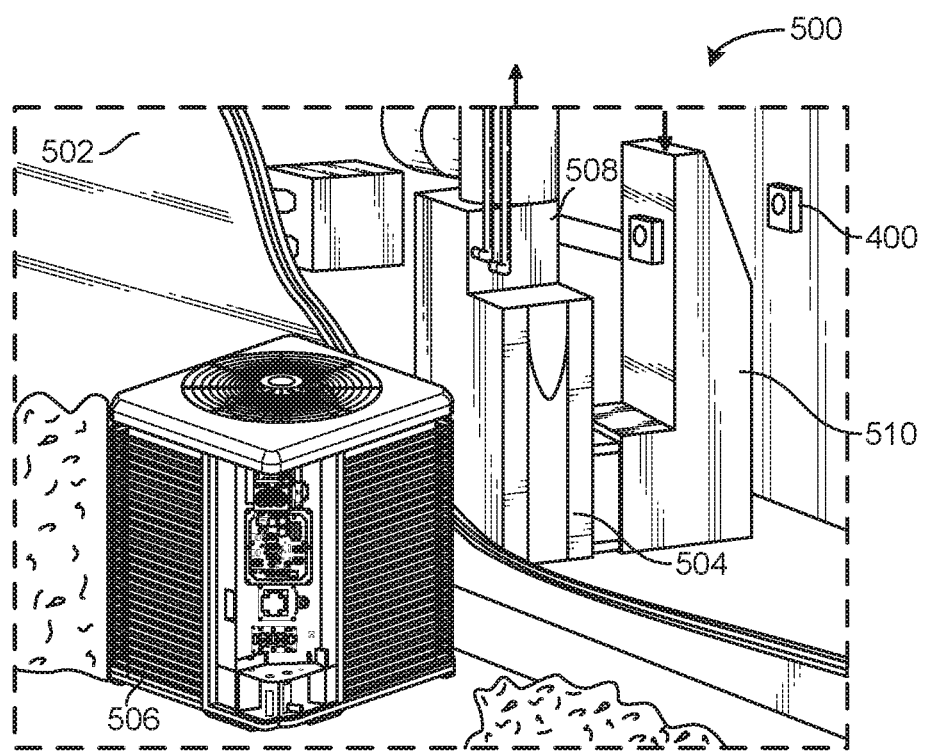
FIG. 5 is a schematic drawing of a building equipped with a residential heating and cooling system and the thermostat of FIG. 4, according to an exemplary embodiment.

Referring now to FIG. 5, a residential heating and cooling system 500 is shown, according to an exemplary embodiment. The residential heating and cooling system 500 may provide heated and cooled air to a residential structure. Although described as a residential heating and cooling system 500, embodiments of the systems and methods described herein can be utilized in a cooling unit or a heating unit in a variety of applications include commercial HVAC units (e.g., roof top units). In general, a residence 502 includes refrigerant conduits that operatively couple an indoor unit 504 to an outdoor unit 506. Indoor unit 504 may be positioned in a utility space, an attic, a basement, and so forth. Outdoor unit 506 is situated adjacent to a side of residence 502. Refrigerant conduits transfer refrigerant between indoor unit 504 and outdoor unit 506, typically transferring primarily liquid refrigerant in one direction and primarily vaporized refrigerant in an opposite direction.

When the system 500 shown in FIG. 5 is operating as an air conditioner, a coil in outdoor unit 506 serves as a condenser for recondensing vaporized refrigerant flowing from indoor unit 504 to outdoor unit 506 via one of the refrigerant conduits. In these applications, a coil of the indoor unit 504, designated by the reference numeral 508, serves as an evaporator coil. Evaporator coil 508 receives liquid refrigerant (which may be expanded by an expansion device, not shown) and evaporates the refrigerant before returning it to outdoor unit 506.

Outdoor unit 506 draws in environmental air through its sides, forces the air through the outer unit coil using a fan, and expels the air. When operating as an air conditioner, the air is heated by the condenser coil within the outdoor unit 506 and exits the top of the unit at a temperature higher than it entered the sides. Air is blown over indoor coil 508 and is then circulated through residence 502 by means of ductwork 510, as indicated by the arrows entering and exiting ductwork 510. The overall system 500 operates to maintain a desired temperature as set by thermostat 400. When the temperature sensed inside the residence 502 is higher than the set point on the thermostat 400 (with the addition of a relatively small tolerance), the air conditioner will become operative to refrigerate additional air for circulation through the residence 502. When the temperature reaches the set point (with the removal of a relatively small tolerance), the unit can stop the refrigeration cycle temporarily.

In some embodiments, the system 500 configured so that the outdoor unit 506 is controlled to achieve a more elegant control over temperature and humidity within the residence 502. The outdoor unit 506 is controlled to operate components within the outdoor unit 506, and the system 500, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 6:
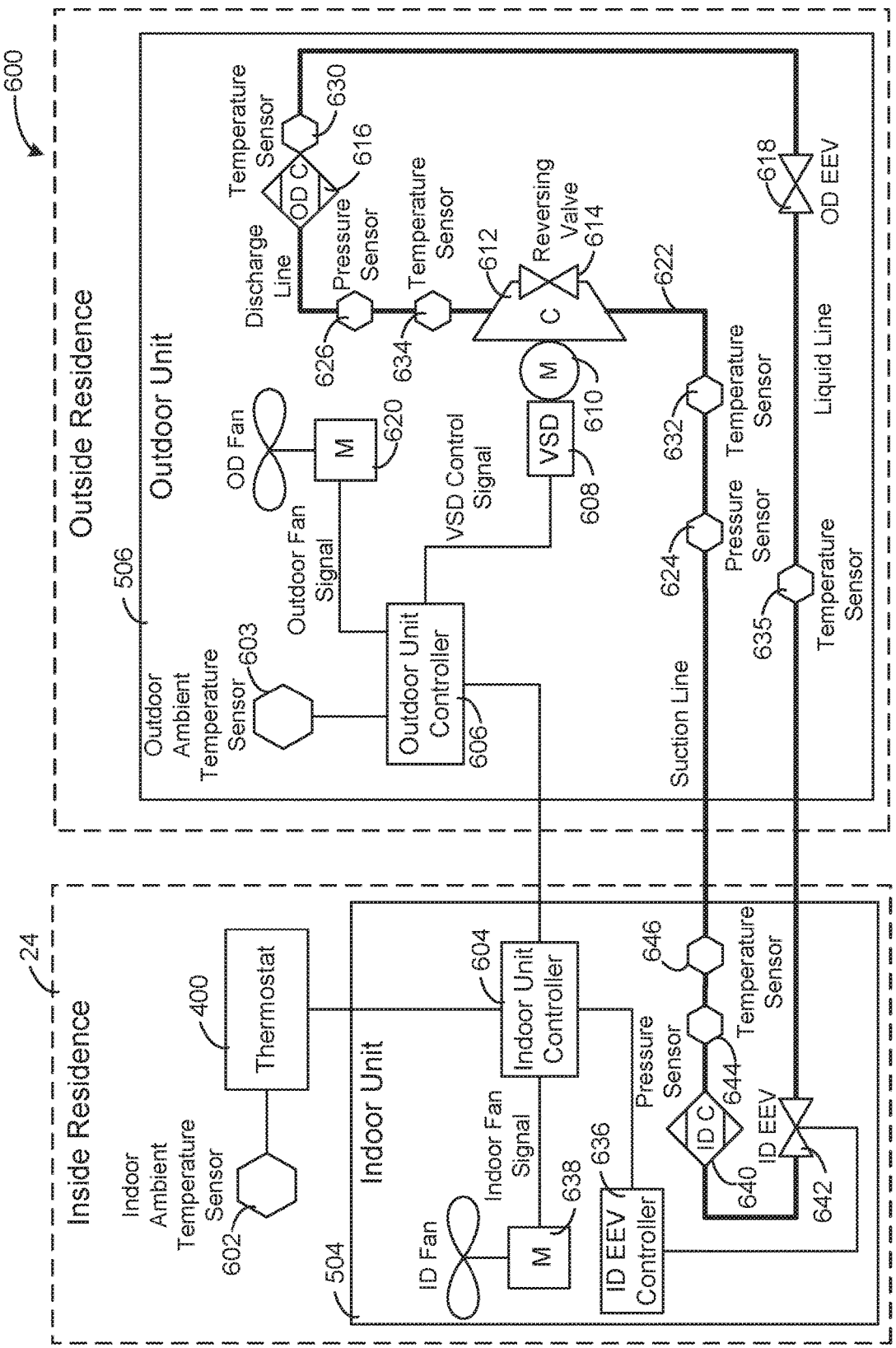
FIG. 6 is a schematic drawing of the thermostat and the residential heating and cooling system of FIG. 4, according to an exemplary embodiment.

Referring now to FIG. 6, an HVAC system 600 is shown according to an exemplary embodiment. Various components of system 600 are located inside residence 502 while other components are located outside residence 502. Outdoor unit 506, as described with reference to FIG. 5, is shown to be located outside residence 502 while indoor unit 504 and thermostat 400, as described with reference to FIG. 6, are shown to be located inside the residence 502. In various embodiments, the thermostat 400 can cause the indoor unit 504 and the outdoor unit 506 to heat residence 502. In some embodiments, the thermostat 400 can cause the indoor unit 504 and the outdoor unit 506 to cool the residence 502. In some embodiments, the thermostat 400 commands an airflow change within the residence 502 to adjust the humidity within the residence 502.

Thermostat 400 can be configured to generate control signals for indoor unit 504 and/or outdoor unit 506. The thermostat 400 is shown to be connected to an indoor ambient temperature sensor 602, and an outdoor unit controller 606 is shown to be connected to an outdoor ambient temperature sensor 603. The indoor ambient temperature sensor 602 and the outdoor ambient temperature sensor 603 may be any kind of temperature sensor (e.g., thermistor, thermocouple, etc.). The thermostat 400 may measure the temperature of residence 502 via the indoor ambient temperature sensor 602. Further, the thermostat 400 can be configured to receive the temperature outside residence 502 via communication with the outdoor unit controller 606. In various embodiments, the thermostat 400 generates control signals for the indoor unit 504 and the outdoor unit 506 based on the indoor ambient temperature (e.g., measured via indoor ambient temperature sensor 602), the outdoor temperature (e.g., measured via the outdoor ambient temperature sensor 603), and/or a temperature set point.

The indoor unit 504 and the outdoor unit 506 may be electrically connected. Further, indoor unit 504 and outdoor unit 506 may be coupled via conduits 622. The outdoor unit 506 can be configured to compress refrigerant inside conduits 622 to either heat or cool the building based on the operating mode of the indoor unit 504 and the outdoor unit 506 (e.g., heat pump operation or air conditioning operation). The refrigerant inside conduits 622 may be any fluid that absorbs and extracts heat. For example, the refrigerant may be hydro fluorocarbon (HFC) based R-410A, R-407C, and/or R-134a.

The outdoor unit 506 is shown to include the outdoor unit controller 606, a variable speed drive 608, a motor 610 and a compressor 612. The outdoor unit 506 can be configured to control the compressor 612 and to further cause the compressor 612 to compress the refrigerant inside conduits 622. In this regard, the compressor 612 may be driven by the variable speed drive 608 and the motor 610. For example, the outdoor unit controller 606 can generate control signals for the variable speed drive 608. The variable speed drive 608 (e.g., an inverter, a variable frequency drive, etc.) may be an AC-AC inverter, a DC-AC inverter, and/or any other type of inverter. The variable speed drive 608 can be configured to vary the torque and/or speed of the motor 610 which in turn drives the speed and/or torque of compressor 612. The compressor 612 may be any suitable compressor such as a screw compressor, a reciprocating compressor, a rotary compressor, a swing link compressor, a scroll compressor, or a turbine compressor, etc.

In some embodiments, the outdoor unit controller 606 is configured to process data received from the thermostat 400 to determine operating values for components of the system 600, such as the compressor 612. In one embodiment, the outdoor unit controller 606 is configured to provide the determined operating values for the compressor 612 to the variable speed drive 608, which controls a speed of the compressor 612. The outdoor unit controller 606 is controlled to operate components within the outdoor unit 506, and the indoor unit 504, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 606 can control a reversing valve 614 to operate system 600 as a heat pump or an air conditioner. For example, the outdoor unit controller 606 may cause reversing valve 614 to direct compressed refrigerant to the indoor coil 508 while in heat pump mode and to an outdoor coil 616 while in air conditioner mode. In this regard, the indoor coil 508 and the outdoor coil 616 can both act as condensers and evaporators depending on the operating mode (i.e., heat pump or air conditioner) of system 600.

Further, in various embodiments, outdoor unit controller 606 can be configured to control and/or receive data from an outdoor electronic expansion valve (EEV) 518. The outdoor electronic expansion valve 518 may be an expansion valve controlled by a stepper motor. In this regard, the outdoor unit controller 606 can be configured to generate a step signal (e.g., a PWM signal) for the outdoor electronic expansion valve 518. Based on the step signal, the outdoor electronic expansion valve 518 can be held fully open, fully closed, partial open, etc. In various embodiments, the outdoor unit controller 606 can be configured to generate step signal for the outdoor electronic expansion valve 518 based on a subcool and/or superheat value calculated from various temperatures and pressures measured in system 600. In one embodiment, the outdoor unit controller 606 is configured to control the position of the outdoor electronic expansion valve 518 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit controller 606 can be configured to control and/or power outdoor fan 620. The outdoor fan 620 can be configured to blow air over the outdoor coil 616. In this regard, the outdoor unit controller 606 can control the amount of air blowing over the outdoor coil 616 by generating control signals to control the speed and/or torque of outdoor fan 620. In some embodiments, the control signals are pulse wave modulated signals (PWM), analog voltage signals (i.e., varying the amplitude of a DC or AC signal), and/or any other type of signal. In one embodiment, the outdoor unit controller 606 can control an operating value of the outdoor fan 620, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 506 may include one or more temperature sensors and one or more pressure sensors. The temperature sensors and pressure sensors may be electrical connected (i.e., via wires, via wireless communication, etc.) to the outdoor unit controller 606. In this regard, the outdoor unit controller 606 can be configured to measure and store the temperatures and pressures of the refrigerant at various locations of the conduits 622. The pressure sensors may be any kind of transducer that can be configured to sense the pressure of the refrigerant in the conduits 622. The outdoor unit 506 is shown to include pressure sensor 624. The pressure sensor 624 may measure the pressure of the refrigerant in conduit 622 in the suction line (i.e., a predefined distance from the inlet of compressor 612). Further, the outdoor unit 506 is shown to include pressure sensor 626. The pressure sensor 626 may be configured to measure the pressure of the refrigerant in conduits 622 on the discharge line (e.g., a predefined distance from the outlet of compressor 612).

The temperature sensors of outdoor unit 506 may include thermistors, thermocouples, and/or any other temperature sensing device. The outdoor unit 506 is shown to include temperature sensor 630, temperature sensor 632, temperature sensor 634, and temperature sensor 636. The temperature sensors (i.e., temperature sensor 630, temperature sensor 632, temperature sensor 635, and/or temperature sensor 646) can be configured to measure the temperature of the refrigerant at various locations inside conduits 622.

Referring now to the indoor unit 504, the indoor unit 504 is shown to include indoor unit controller 604, indoor electronic expansion valve controller 636, an indoor fan 638, an indoor coil 640, an indoor electronic expansion valve 642, a pressure sensor 644, and a temperature sensor 646. The indoor unit controller 604 can be configured to generate control signals for indoor electronic expansion valve controller 642. The signals may be set points (e.g., temperature set point, pressure set point, superheat set point, subcool set point, step value set point, etc.). In this regard, indoor electronic expansion valve controller 636 can be configured to generate control signals for indoor electronic expansion valve 642. In various embodiments, indoor electronic expansion valve 642 may be the same type of valve as outdoor electronic expansion valve 618. In this regard, indoor electronic expansion valve controller 636 can be configured to generate a step control signal (e.g., a PWM wave) for controlling the stepper motor of the indoor electronic expansion valve 642. In this regard, indoor electronic expansion valve controller 636 can be configured to fully open, fully close, or partially close the indoor electronic expansion valve 642 based on the step signal.

Indoor unit controller 604 can be configured to control indoor fan 638. The indoor fan 638 can be configured to blow air over indoor coil 640. In this regard, the indoor unit controller 604 can control the amount of air blowing over the indoor coil 640 by generating control signals to control the speed and/or torque of the indoor fan 638. In some embodiments, the control signals are pulse wave modulated signals (PWM), analog voltage signals (i.e., varying the amplitude of a DC or AC signal), and/or any other type of signal. In one embodiment, the indoor unit controller 604 may receive a signal from the outdoor unit controller indicating one or more operating values, such as speed for the indoor fan 638. In one embodiment, the operating value associated with the indoor fan 638 is an airflow, such as cubic feet per minute (CFM). In one embodiment, the outdoor unit controller 606 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 604 may be electrically connected (e.g., wired connection, wireless connection, etc.) to pressure sensor 644 and/or temperature sensor 646. In this regard, the indoor unit controller 604 can take pressure and/or temperature sensing measurements via pressure sensor 644 and/or temperature sensor 646. In one embodiment, pressure sensor 644 and temperature sensor 646 are located on the suction line (i.e., a predefined distance from indoor coil 640). In some embodiments, the pressure sensor 644 and/or the temperature sensor 646 is located on the liquid line (i.e., a predefined distance from indoor coil 640).

Thermostat with Projector for Display

Figure 7:
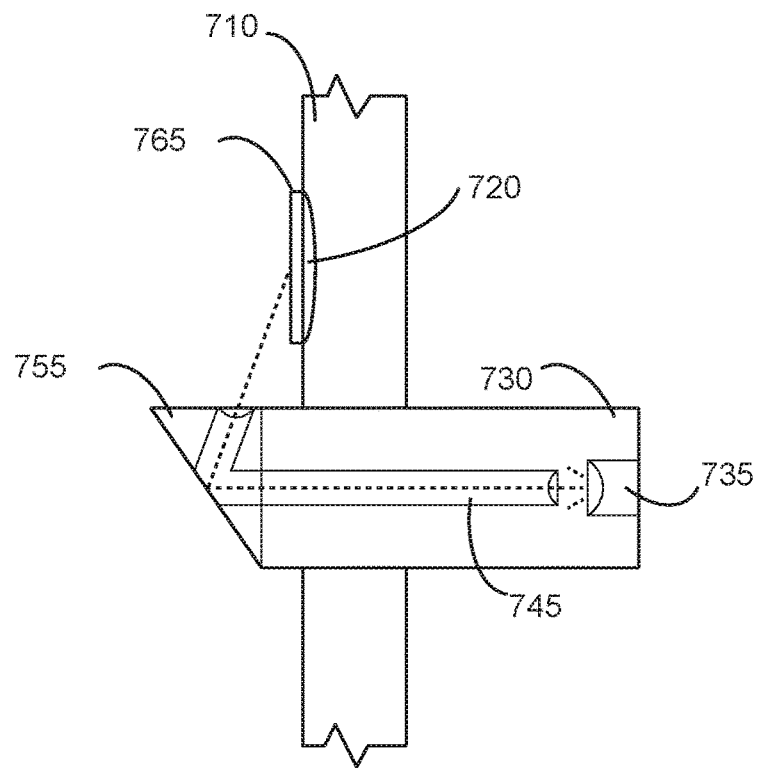
FIG. 7 is a schematic drawing of a thermostat with a lens reflecting an image from a projector onto a surface, according to an exemplary embodiment.

Referring now to FIG. 7, a thermostat 730 is shown. In FIG. 7, three main elements, mounting surface 710, projection surface 720, and thermostat 730 are shown. Mounting surface 710 can mount, fasten or otherwise secure thermostat 730 in a fixed position. Mounting surface 710 may be a wall or other surface and may be part of a house, office, or other building or structure. For example, the surface 710 can be a wall of the building 10 as described with reference to FIG. 1 or the residence 502 as described with reference to FIG. 5. Thermostat 730 may be fastened to, or situated at least partially within, mounting surface 710. By way of example, mounting surface 710 could be drywall including a hole through which thermostat 730 protrudes while being fastened to the drywall itself. Projection surface 720 can be a projection medium for thermostat 730 and can render the projected display of thermostat 730 visible to a user.

In some embodiments, projection surface 720 is a uniform section of mounting surface 710. However, in some embodiments, projection surface 720 is a different section of mounting surface 710, is fastened or otherwise affixed to mounting surface 710, or is a disparate surface or fastened to a disparate surface altogether. In some embodiments, projection surface 720 includes touch sensitive elements allowing thermostat 730 to receive user input from projection surface 720. The touch sensitive elements can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Projection surface 720 can be located above thermostat 730. However, in some embodiments, projection surface 720 can be located below, to the side of, or otherwise positionally disparate of thermostat 730.

Thermostat 730 can operate (e.g., generate control signals for, etc.) indoor unit 504 and/or outdoor unit 506 to control environmental conditions (e.g., heating, cooling, humidity levels, etc.). In some embodiments, thermostat 730 generates control signals for another device or system not here mentioned. In some embodiments, thermostat 730 communicates with external connected devices. By way of example, thermostat 730 could control a smart dehumidifier and send push notifications to a smart phone when the smart dehumidifier needs to be emptied. Thermostat 730 can include a display source, shown as source display 735, an image guide, shown as waveguide 745, an image projector, shown as lens 755, and a projected display, shown as display 765.

Source display 735 can be a light producing element (e.g., a projector, etc.) configured to produce the display image for thermostat 730. Source display 735 may use any of a variety of projection technologies such as liquid-crystal display (LCD), liquid-crystal on silicon (LCoS), digital light processing (DLP), cathode ray tube (CRT), or any other display technologies known in the art. Source display 735 may be located within thermostat 730 such that source display 735 is protected from external physical damage. Source display 735 may be controlled by thermostat 730 as described in greater detail with reference to FIG. 11.

Waveguide 745 can direct the display image of source display 735 to lens 755. Waveguide 745 may use any of a variety of waveguide technologies such as silicon-on-sapphire (SOS), silicon-on-nitride (SON), all-silicon optical platform (ASOP), silicon-on-lithium-niobate (SiLN), optical fiber, photonic-crystal fiber, or any other waveguide technologies known in the art. In some embodiments, waveguide 745 directs the display image of source display 735 to any other element.

Lens 755 can project the display image, as display 765, produced by source display 735 onto projection surface 720. Lens 755 may use any of a variety of lens technologies such as standard throw, short throw, ultra-short throw, long throw, convex lens, tilt-shift lens, anamorphic lens, or any other lens technologies known in the art. In some embodiments, lens 755 receives the display image from waveguide 745 while is some embodiments lens 755 receives the display image from another component not here listed. Lens 755 may include focus adjustment controls and/or display image size controls. Lens 755 may be controlled by thermostat 730. In some embodiments, lens 755 is controlled by another component or system not here mentioned. In some embodiments, the lens 755 is replaced with another waveguide (or is part of the waveguide 745) with a diffraction grating that causes the light of the source display 735 to be directed onto the projection surface 720.

Display 765 can be the projected image produced by source display 735. Display 765 can provide visual information to a user from thermostat 730. For example, the visual information can be an ambient temperature, a setpoint, thermostat faults, user interfaces, and/or any other thermostat information. Display 765 can adaptively adjust brightness and/or color to best be seen by a user as described in greater detail with reference to FIGS. 11, 13, and 14. In some embodiments, thermostat 730 includes components to detect user interaction with display 765. By way of example, thermostat 730 could include sensors, cameras, and/or laser arrays to detect the presence of a user finger near display 765.

Figure 8:
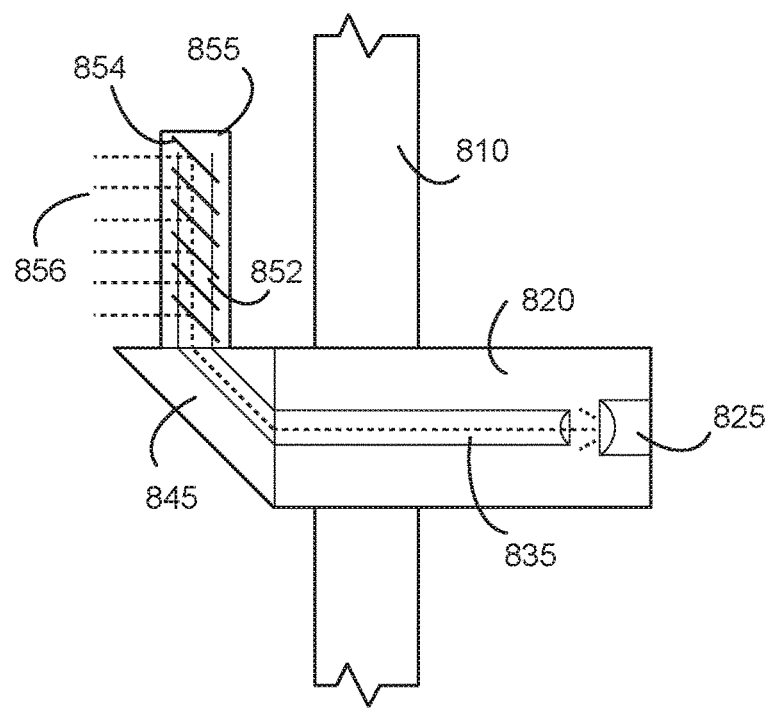
FIG. 8 is a schematic drawing of a thermostat with a waveguide projecting an image from a projector onto a surface, according to an exemplary embodiment.

Referring now to FIG. 8, a thermostat 820 is shown, according to an exemplary embodiment. In FIG. 8, two main elements, mounting surface 810 and thermostat 820 are shown. Mounting surface 810 can mount, fasten or otherwise secure thermostat 820 in a fixed position. Mounting surface 810 may be a wall or other surface and may be part of a house, office, or other building or structure. For example, the surface 810 can be a wall of the building 10 as described with reference to FIG. 1 or the residence 502 as described with reference to FIG. 5. Thermostat 820 may be fastened to, or situated at least partially within, mounting surface 810. By way of example, mounting surface 810 could be drywall including a hole through which thermostat 820 protrudes while being fastened to the drywall itself.

Thermostat 820 can generate control signals for indoor unit 504 and/or outdoor unit 506. In some embodiments, thermostat 820 generates control signals for another device or system not here mentioned. In some embodiments, thermostat 820 communicates with external connected devices. By way of example, thermostat 820 could control a smart dehumidifier and send push notifications to a smart phone when the smart dehumidifier needs to be emptied. Thermostat 820 can include a display source, shown as source display 825, a first image guide, shown as waveguide 835, a second image guide, shown as prism 845, and a projection surface 855.

Source display 825 can be a light producing element configured to produce the display image for thermostat 820. Source display 825 may use any of a variety of projection technologies such as liquid-crystal display (LCD), liquid-crystal on silicon (LCoS), digital light processing (DLP), cathode ray tube (CRT), or any other display technologies known in the art. Source display 825 may be located within thermostat 820 such that source display 825 can be protected from external physical damage. Source display 825 may be controlled by thermostat 820 as described in greater detail with reference to FIG. 11.

Waveguide 835 can direct the display image of source display 835 to prism 845. Waveguide 835 may use any of a variety of waveguide technologies such as silicon-on-sapphire (SOS), silicon-on-nitride (SON), all-silicon optical platform (ASOP), silicon-on-lithium-niobate (SiLN), optical fiber, photonic-crystal fiber, or any other waveguide technologies known in the art. In some embodiments, waveguide 835 directs the display image of source display 825 to any other element.

Prism 845 can direct the display image of source display 835 to projection surface 855. Prism 845 may use any of a variety of prism technologies such as polarizing prisms, beam-splitting prisms, reflective prisms, dispersive prisms, deflecting prisms, wedge prisms, beam steering prisms, anamorphic pair prisms, rhomboid prisms, or other prism technology known in the art. Prism 845 may be constructed of glass, plastic, fluorite, or another material or composite not here mentioned. In some embodiments prism 845 is a waveguide similar to waveguide 835. Prism 845 may be controlled by thermostat 820. In some embodiments, prism 845 is controlled by another component or system not here mentioned.

Projection surface 855 can provide visual information to a user from thermostat 820. In some embodiments, projection surface 855 is removable or retractable and can be constructed from glass, plastic, fluorite, or another material or composite not here mentioned. Projection surface 855 can include an image guide, shown as waveguide 852 and a projected display, shown as display 856. In some embodiments, projection surface 855 includes touch sensitive elements configured to detect user input and send the user input to thermostat 820. The touch sensitive elements can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art.

Waveguide 852 can direct the display image of source display 835 to a user. In some embodiments, waveguide 852 is an optical holographic relief waveguide. In some embodiments, waveguide 852 takes other forms such as a surface relief waveguide, prism, combiner, or other element. Waveguide 852 can include holographic reflective optics, shown as optics 854. Optics 854 can direct the display image from waveguide 852 to a user, producing display 856. In some embodiments, optics 854 takes another form not here mentioned. In some embodiments, waveguide 852 directs the display image of source display 835 to any other element.

Display 856 can be the projected image produced by source display 825. In some embodiments, source display 825 produces display 856 that provides visual information to a user. Display 856 can adaptively adjust brightness and/or color to best be seen by a user as described in greater detail with reference to FIGS. 11, 13, and 14. In some embodiments, thermostat 820 includes components to detect user interaction with display 856. By way of example, thermostat 820 could include sensors, cameras, and/or laser arrays to detect the presence of a user finger near display 856.

Figure 9:
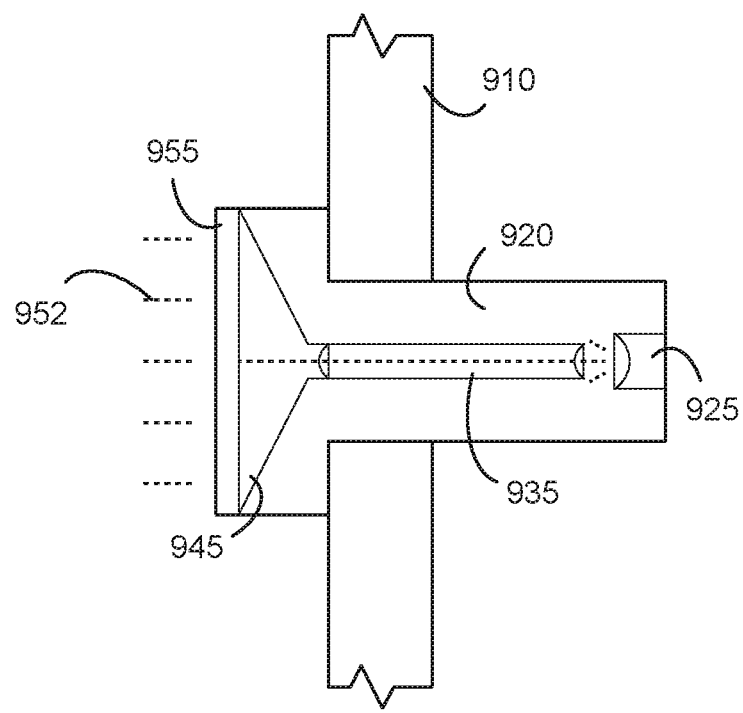
FIG. 9 is a schematic drawing of a thermostat with rear projection, according to an exemplary embodiment.

Referring now to FIG. 9, a thermostat 920 is shown, according to an exemplary embodiment. In FIG. 9, two main elements, mounting surface 910 and thermostat 920 are shown. Mounting surface 910 can act to mount, fasten or otherwise secure thermostat 920 in a fixed position. Mounting surface 910 may be a wall or other surface and may be part of a house, office, or other building or structure. For example, the surface 910 can be a wall of the building 10 as described with reference to FIG. 1 or the residence 502 as described with reference to FIG. 5. Thermostat 920 may be fastened to, or situated at least partially within, mounting surface 910. By way of example, mounting surface 910 could be drywall including a hole through which thermostat 920 protrudes while being fastened to the drywall itself.

Thermostat 920 can generate control signals for indoor unit 504 and/or outdoor unit 506. In some embodiments, thermostat 920 generates control signals for another device or system not here mentioned. In some embodiments, thermostat 920 communicates with external connected devices. By way of example, thermostat 920 could control a smart dehumidifier and send push notifications to a smart phone when the smart dehumidifier needs to be emptied. Thermostat 920 can include a display source, shown as source display 925, a first image guide, shown as waveguide 935, a second image guide, shown as lens 945, and a projection surface 955.

Source display 925 can be a light producing element configured to produce the display image for thermostat 920. Source display 925 may use any of a variety of projection technologies such as liquid-crystal display (LCD), liquid-crystal on silicon (LCoS), digital light processing (DLP), cathode ray tube (CRT), or any other display technologies known in the art. Source display 925 may be located within thermostat 920 such that source display 925 can be protected from external physical damage. Source display 925 may be controlled by thermostat 920 as described in greater detail with reference to FIG. 11. Source display 925 can be configured for rear projection.

Waveguide 935 can direct the display image of source display 935 to lens 945. Waveguide 935 may use any of a variety of waveguide technologies such as silicon-on-sapphire (SOS), silicon-on-nitride (SON), all-silicon optical platform (ASOP), silicon-on-lithium-niobate (SiLN), optical fiber, photonic-crystal fiber, or any other waveguide technologies known in the art. In some embodiments, waveguide 935 directs the display image of source display 925 to any other element.

Lens 945 can project the image, as display 952, produced by source display 925 onto projection surface 955. In some embodiments, lens 945 is a rear projection lens. Lens 945 may use any of a variety of lens technologies such as standard throw, short throw, ultra-short throw, long throw, convex lens, tilt-shift lens, anamorphic lens, or any other lens technologies known in the art. In some embodiments lens 945 is a waveguide similar to waveguide 935 or a prism similar to prism 845. In some embodiments, lens 945 receives the display image from waveguide 935 while is some embodiments lens 945 receives the display image from another component not here listed. Lens 945 may include focus adjustment controls and/or display image size controls. Lens 945 may be controlled by thermostat 920. In some embodiments, lens 945 is controlled by another component or system not here mentioned.

Projection surface 955 can be a projection medium for thermostat 920 and can render the projected display of thermostat 920 visible to a user. Projection surface 955 can be a flat opaque white surface or other surface and can be made of polyvinyl chloride (PVC), glass, plastic, fluorite or can be made of a different material or composite not here mentioned. In some embodiments, projection surface 955 includes touch sensitive elements allowing thermostat 920 to receive user input from projection surface 955. The touch sensitive elements can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Projection surface 955 can be located above thermostat 920.

However, in some embodiments, projection surface 955 can be located below, to the side of, or otherwise positionally disparate of thermostat 920. In some embodiments, projection surface 955 is removable or retractable. Display 952 can be produced on projection surface 955 by lens 945. Display 952 can provide visual information to a user from thermostat 920. Display 952 can adaptively adjust brightness and/or color to best be seen by a user as described in greater detail with reference to FIGS. 11, 13, and 14.

Figure 10:
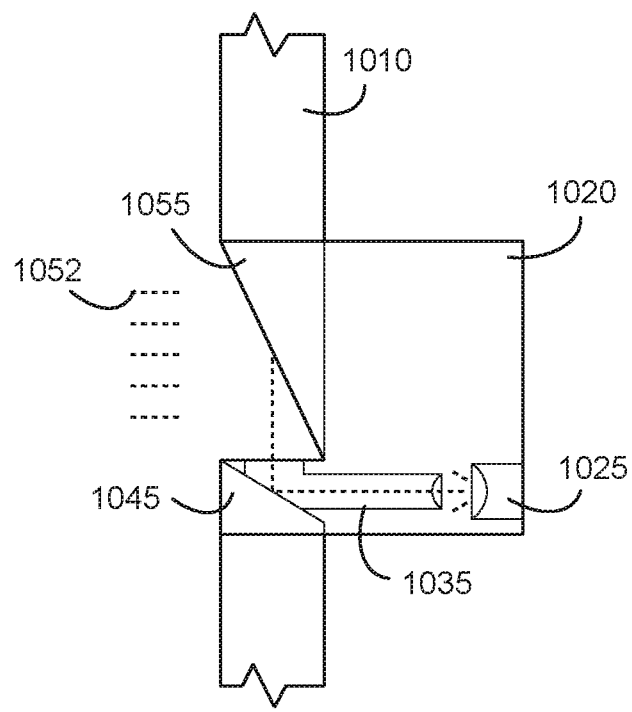
FIG. 10 is a schematic drawing of a thermostat with a combiner forming an image from a projector, according to an exemplary embodiment.

Referring now to FIG. 10, a thermostat 1020 is shown, according to an exemplary embodiment. In FIG. 10, two main elements, mounting surface 1010 and thermostat 1020 are shown. Mounting surface 1010 can act to mount, fasten or otherwise secure thermostat 1020 in a fixed position. Mounting surface 1010 may be a wall or other surface and may be part of a house, office, or other building or structure. For example, the surface 1010 can be a wall of the building 10 as described with reference to FIG. 1 or the residence 502 as described with reference to FIG. 5. Thermostat 1020 may be fastened to, or situated at least partially within, mounting surface 1010. By way of example, mounting surface 1010 could be drywall including a hole through which thermostat 1020 protrudes while being fastened to the drywall itself.

Thermostat 1020 can generate control signals for indoor unit 504 and/or outdoor unit 506. In some embodiments, thermostat 1020 generates control signals for another device or system not here mentioned. In some embodiments, thermostat 1020 communicates with external connected devices. By way of example, thermostat 1020 could control a smart dehumidifier and send push notifications to a smart phone when the smart dehumidifier needs to be emptied. Thermostat 1020 can include a display source, shown as source display 1025, a first image guide, shown as waveguide 1035, a second image guide, shown as prism 1045, and a projection surface 1055.

Source display 1025 can be a light producing element configured to produce the display image for thermostat 1020. Source display 1025 may use any of a variety of projection technologies such as liquid-crystal display (LCD), liquid-crystal on silicon (LCoS), digital light processing (DLP), cathode ray tube (CRT), or any other display technologies known in the art. Source display 1025 may be located within thermostat 1020 such that source display 1025 can be protected from external physical damage. Source display 1025 may be controlled by thermostat 1020 as described in greater detail with reference to FIG. 11. Source display 1025 can be configured for holographic projection.

Waveguide 1035 can direct the display image of source display 1035 to prism 1045. Waveguide 1035 may use any of a variety of waveguide technologies such as silicon-on-sapphire (SOS), silicon-on-nitride (SON), all-silicon optical platform (ASOP), silicon-on-lithium-niobate (SiLN), optical fiber, photonic-crystal fiber, or any other waveguide technologies known in the art. In some embodiments, waveguide 1035 directs the display image of source display 1025 to any other element.

Prism 1045 can project the image, as display 1052, produced by source display 1025 onto projection surface 1055. In some embodiments, prism 1045 can be a rear projection lens. Prism 1045 may use any of a variety of prism technologies such as polarizing prisms, beam-splitting prisms, reflective prisms, dispersive prisms, deflecting prisms, wedge prisms, beam steering prisms, anamorphic pair prisms, rhomboid prisms, or other prism technology known in the art. Prism 1045 may be constructed of glass, plastic, fluorite, or another material or composite not here mentioned. In some embodiments prism 1045 is a waveguide similar to waveguide 1035 or a lens similar to lens 945. In some embodiments, prism 1045 is controllable by thermostat 1020.

Projection surface 1055 can be a projection medium for thermostat 1020 and can render the projected display of the thermostat 1020 visible to a user. In some embodiments, projection surface 1055 is a recombiner. In some embodiments projection surface 1055 takes a different form such as a mirror, lens element, reflector, waveguide, or some form not here mentioned. In some embodiments, projection surface 1055 is removable or retractable and can be constructed from glass, plastic, fluorite, or another material or composite not here mentioned. Projection surface 1055 may be transparent such that a user can view information on display 1052 and view the surface located behind display 1052. Display 1052 can be produced on projection surface 1055 by prism 1045. Display 1052 can provide visual information to a user from thermostat 1020. Display 1052 can adaptively adjust brightness and/or color to best be seen by a user as described in greater detail with reference to FIGS. 11, 13, and 14.

Figure 11:
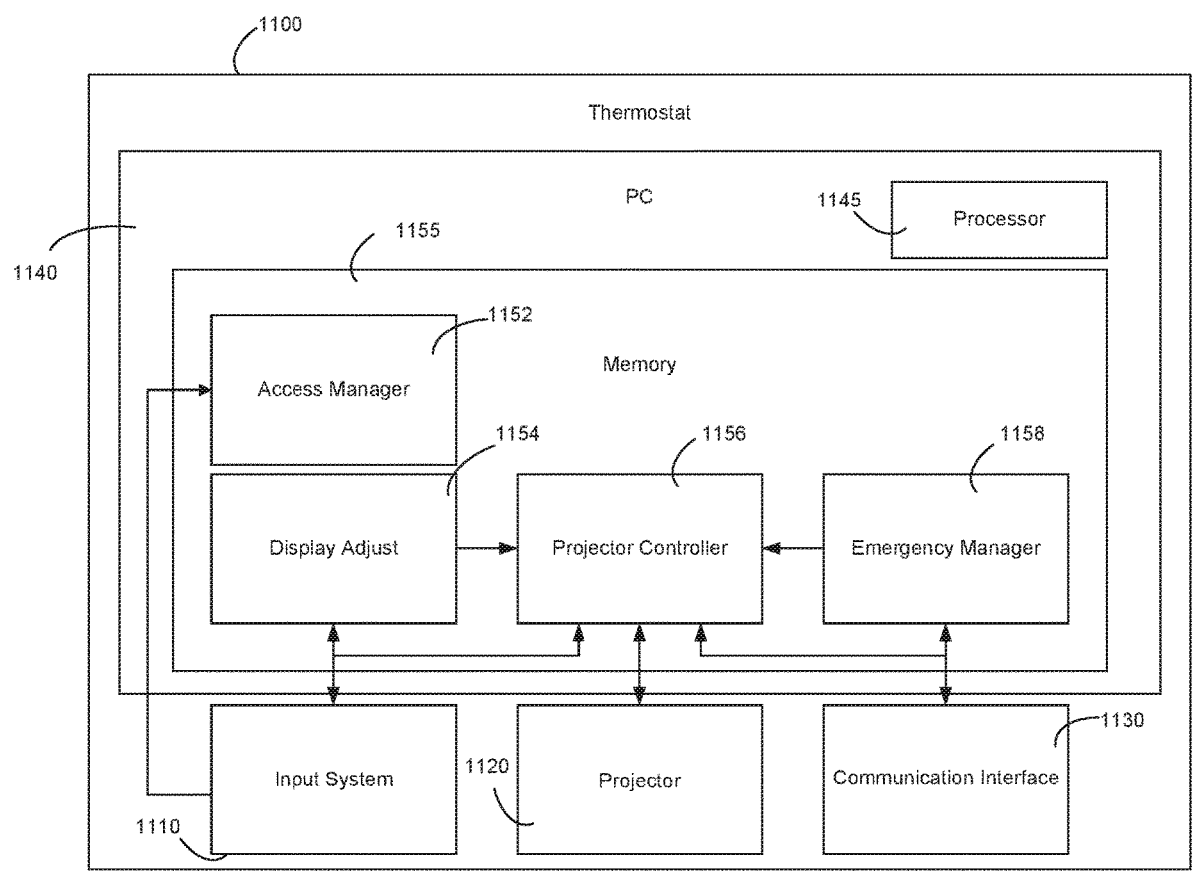
FIG. 11 is a block diagram of one of the thermostats of FIGS. 7-8 using a projector for display, according to an exemplary embodiment.

Referring now to FIG. 11, a thermostat 1100 using a projector for display is shown, according to an exemplary embodiment. Thermostat 1110 can be any one or combination of the thermostats (e.g., thermostat 730, thermostat 820, thermostat 920, thermostat 1020, etc.) as described with reference to FIGS. 7-10. Thermostat 1100 can generate control signals for indoor unit 504 and/or outdoor unit 506. In some embodiments, thermostat 1100 generates control signals for another device or system not here mentioned. In some embodiments, thermostat 1100 communicates with external connected devices. By way of example, thermostat 1100 could control a smart dehumidifier and send push notifications to a smart phone when the smart dehumidifier needs to be emptied. Thermostat 1100 can include input system 1110, projector 1120, communications interface 1130 and processing circuit (PC).

Processing circuit 1140 can operate building equipment to control an environmental condition within a building, receive sensor data from a plurality of sensors, receive emergency alert data, receive user input, and receive ambient light intensity and color data. Processing circuit 1140 can implement the functionality of thermostat 1100. Processing circuit 1140 can include a processor 1145 and a memory 1155.

Processor 1145 can be implemented as a general purpose processor, an application specific integrated circuit (ASIC), one or more field programmable gate arrays (FPGAs), a group of processing components, or other suitable electronic processing components. Processor 1145 can include memory 1155. Processor 1145 can be communicably connected to input system 1100, projector 1120, and communications interface 1130.

Memory 1155 can be or include volatile memory and/or non-volatile memory. Memory 1155 can include object code components, script components, or any other type of information structure for supporting the various activities and information structures described in the present application. Memory 1155 can include one or more devices (e.g., memory units, memory devices, storage devices, etc.) for storing data and/or computer code for completing and/or facilitating the various processes, layers and modules described in the present application. Memory 1155 can include random access memory (RAM), read-only memory (ROM), hard drive storage, temporary storage, non-volatile memory, flash memory, optical memory, or any other suitable memory for storing software objects and/or computer instructions.

In some embodiments, memory 1155 is communicably connected to processor 1145 via processing circuit 1140 and can include computer code for executing (e.g., by the processing circuit 1140 and/or the processor 1145) one or more processes of functionality described herein. In some embodiments, memory 1155 includes an access manager 1152, a display adjust 1154, a projector controller 1156, and an emergency manager 1158. In some embodiments, access manager 1152, display adjust 1154, projector controller 1156, and/or emergency manager 1158 are implemented as functionalities of processor 1145 or standalone modules within the processing circuit 1140.

Access manager 1152 can control user access to the thermostat 1100. Access manager 1152 can be communicably connected to input system 1110. Access manager 1152 can receive authorization data from input system 1110, can determine whether the user is authorized to access the thermostat 1100, and if the user is authorized, can allow the user access to the thermostat 1100 controls.

Access manager 1152 may use a password, retina scan, fingerprint scan, biometric data, voice key, digital key, or other authorization data to verify the authorization of the user. Thermostat 1100 can maintain a list of authorized users that the access manager 1152 can search with the authorization data to verify access. In some embodiments, the list of authorized users is stored by the thermostat 1100 itself, while in some embodiments a server or cloud service stores the list of authorized users. By way of example, in a home application with a small number of users the thermostat 1100 could store the list of authorized users, while in a commercial application, with a large number of changing users with various access privileges, the thermostat 1100 could store the list of authorized users in a server or cloud system or the like.

Display adjust 1154 can adjust the light intensity of the thermostat 1100 display based on the ambient light intensity of the space where the thermostat 1100 is located. Display adjust 1154 can adjust the color of the thermostat 1100 display based on the color of the surface the thermostat 1100 is projecting onto. The display adjust 1154 can receive color/intensity data from the input system 1110, can calculate an appropriate light intensity and color for thermostat 1100 display, and can control the projector controller 1156 to use the calculated light intensity and color. By way of example, the display adjust 1154 could select a high light intensity for a room with a high level of ambient light, and a contrasting dark display scheme for a projection surface of a light color.

Emergency manager 1158 can receive emergency alert data from communication interface 1130 and control the projector controller 1156 in response to determining the type of emergency alert. The emergency alert data can be received via a network. The emergency alert data can be received from a server, a building management system, and/or an emergency sensor or system. Examples of a thermostat receiving and processing emergency data can be found in U.S. patent application Ser. No. 16/030,422 filed Jul. 9, 2018, the entirety of which is incorporated by reference herein. This process is covered in greater detail in FIG. 15. Emergency manager can receive various types of emergency alert data including, severe weather alerts, news alerts, NOAA alerts, fire detection alerts, carbon-monoxide alerts, active shooter alerts, emergency drill alerts, medical emergency alerts, and/or other alert types not here mentioned.

Emergency manager 1158 can receive emergency alarm data and determine if an emergency alarm event exists. Emergency manager 1158 may parse and categorize received emergency alarm data according to type. By way of example, an emergency alert received from NOAA relating to a tsunami could be categorized as <severe weather>. Categories can include active shooter, severe weather, fire, flooding, riot, drought, heat wave, high winds, blizzard, forest fire, meteor strike, nuclear meltdown, war, inbound ballistic missile, rabid animal, epidemic, and/or any other category. An emergency alarm event can be determined to exist based on a set of rules and/or preference settings stored by thermostat 1100. By way of example, emergency manager 1158 could use a rule to only trigger an emergency alarm event if the received emergency alarm data is of type <tornado>. Emergency manager 1158 may determine an emergency alarm event exists by parsing the emergency alarm data to determine the location of the event and compare the determined location to the current location of the thermostat 1100 as determined by GPS or other means.

Emergency manager 1158 may update an interface of thermostat 1100. Emergency manager 1158 can update the interface to include response instructions as included in the emergency alarm data, detailed information on the emergency alarm event, evacuation maps, emergency contacts, maps to shelters, and/or any other interface. Thermostat 1100 may store a list of rules and/or preferences that determine the updated interface. By way of example, in the case of a fire, thermostat 1100 could display an evacuation route for the building, while in the case of a severe weather event, thermostat 1100 could provide more detailed information on the weather event.

Projector controller 1156 can control projector 1120 display. Projector controller 1156 can be communicably connected to projector 1120 and can receive data from other modules within thermostat 1100. In some embodiments, projector controller 1156 is implemented in memory 1155, however in some embodiments, projector controller 1156 is implemented in processor 1145 or as a standalone module entirely.

Referring now to input system 1110, an input system for thermostat 1100 is shown. Input system 1110 can receive input from various sources including environmental sensors, temperature sensors, ambient light intensity sensors, color sensors, smoke detectors, humidity sensors, microphones, retina scanners, fingerprint readers, biometric measurement devices, input displays, and other sources not here mentioned. For example, input system 1110 could include a touch-sensitive panel layered on top of an electronic visual display. A user can provide inputs through simple or multi-touch gestures by touching the touch-sensitive panel with one or more fingers and/or with a stylus or pen. The touch-sensitive panel could use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. In some embodiments, input system 1110 receives user input of a user interacting with the projected display of thermostat 1100.

Referring now to projector 1120, a projector display for thermostat 1100 is shown. Projector 1120 can display the user interface of thermostat 1100. Projector 1120 can project onto a variety of surfaces (e.g., glass, wood, laminate, drywall, stone, concrete, etc.). In some embodiments described above, projector 1120 may use any of a variety of projection technologies such as liquid-crystal display (LCD), liquid-crystal on silicon (LCoS), digital light processing (DLP), cathode ray tube (CRT), or any other display technologies known in the art.

Communication interface 1130 can communicatively couple thermostat 1100 with other devices (e.g., servers, systems, etc.) and allow for the exchange of information between thermostat 1100 and other devices. In some embodiments, communication interface 1130 communicatively couples the devices, systems, and servers of thermostat 1100. In some embodiments, the communication interface 1130 is at least one of and/or a combination of a Wi-Fi network, a wired Ethernet network, a Zigbee network, a Bluetooth network, and/or any other wireless network. Communication interface 1130 may be a local area network and/or a wide area network (e.g., the Internet, a building WAN, etc.) and may use a variety of communications protocols (e.g., BACnet, IP, LON, etc.). Communication interface 1130 may include routers, modems, and/or network switches. Communication interface 1130 may be a combination of wired and wireless networks.

Figure 12:
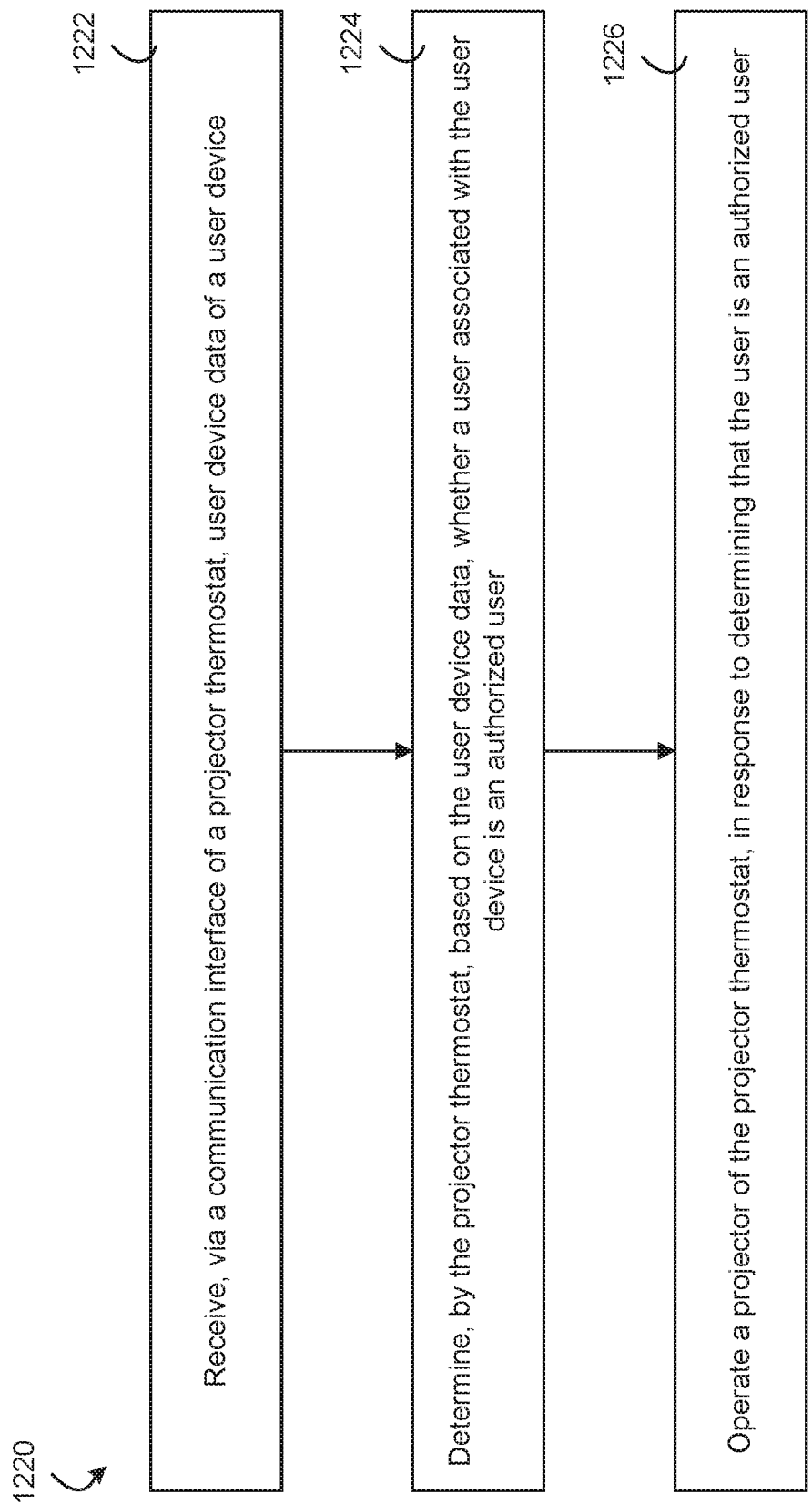
FIG. 12 is a flow diagram of a process for granting access to the thermostat of FIG. 11 via user device data, according to an exemplary embodiment.

Referring now to FIG. 12, a flow diagram of user authorization process 1220 that can be performed by thermostat 1100 as described with reference to FIG. 11 is shown, according to an exemplary embodiment. In some embodiments, user authorization process 1220 occurs in response to an individual attempting to interact with thermostat 1100. User authorization process 1220 can determine whether a user is authorized to access the thermostat of FIG. 11. In some embodiments, user authorization process 1220 unlocks thermostat 1100 or otherwise makes an interface of thermostat 1100 accessible to a user. Thermostat 1100 as described with reference to FIG. 11 can be configured to perform the process 1220. Furthermore, thermostat 400 as described with reference to FIG. 4 can be configured to perform the process 1220. Any computing device as described herein can be configured to perform the process 1220.

In step 1222, thermostat 1100 receives from communication interface 1130 user device data associated with a user device. User device data may be a password, retina scan, fingerprint scan, biometric data, voice key, digital key, or other authorization data. Thermostat 1100 can receive user device data via a Wi-Fi network, a wired Ethernet network, a Zigbee network, a Bluetooth network, and/or any other means known in the art. In some embodiments, thermostat 1100 receives user device data from a user device such as a bracelet, smart phone, pendant and/or any other device via near field communication (NFC) and/or any other means known in the art. By way of example, a user could move a smart watch near the thermostat 1100 to transfer user device data to unlock the thermostat 1100. In some embodiments, thermostat 1100 receives user device data from another source not here mentioned.

In step 1224, thermostat 1100 determines, based on the user device data, whether the user associated with the user device data is an authorized user. Thermostat 1100 can maintain a list of authorized users that access manager 1152 can search with the user device data to verify access. By way of example, if data included in the list of authorized users matches the received user device data then the user associated with the user device data is determined to be an authorized user.

In step 1226, thermostat 1100 operates projector 1120 in response to determining that the user is an authorized user. Operation of projector 1120 can unlock thermostat 1100 or otherwise makes an interface of thermostat 1100 accessible to a user. By way of example, projector 1120 could display a lock screen with dialog "Please enter password to unlock thermostat" and a user interface to accept a password entry from a user until a user correctly entered a password at which time thermostat 1100 could display a default display and allow the user control of thermostat 1100.

Figure 13:
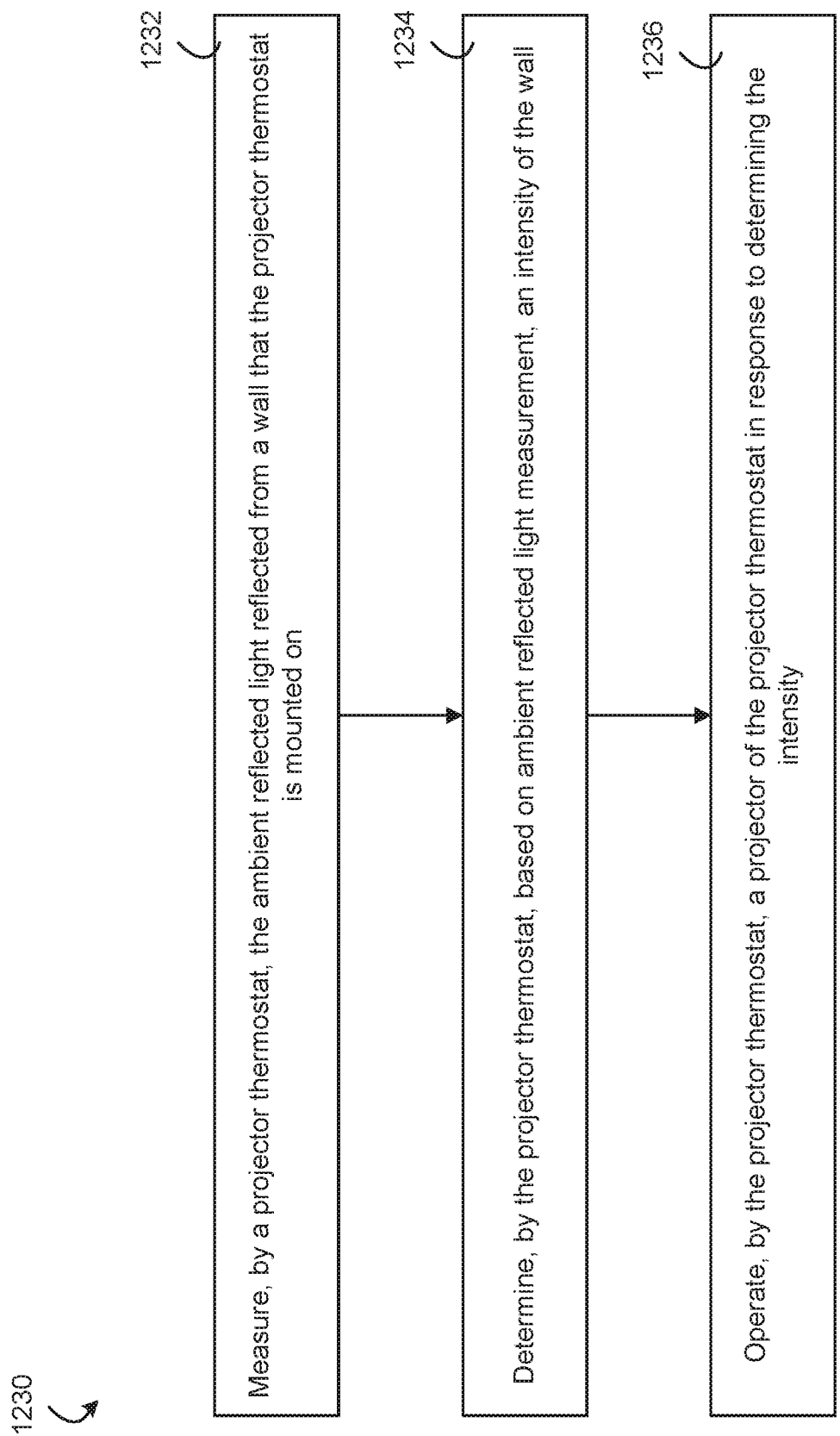
FIG. 13 is a flow diagram of a process for operating the thermostat of FIG. 11 via an ambient reflected light measurement, according to an exemplary embodiment.

Referring now to FIG. 13, a flow diagram of ambient light adjustment process 1230 that can be performed by thermostat 1100 as described with reference to FIG. 11 is shown, according to an exemplary embodiment. In some embodiments, the ambient light adjustment process 1230 adjusts the display brightness of thermostat 1100 to be easily viewed by a user. By way of example, ambient light adjustment process 1230 could select a high light intensity for a room with a high level of ambient light. Thermostat 1100 as described with reference to FIG. 11 can be configured to perform the process 1230. Furthermore, thermostat 400 as described with reference to FIG. 4 can be configured to perform the process 1230. Any computing device as described herein can be configured to perform the process 1230.

In step 1232, thermostat 1100 can measure the ambient reflected light reflected from a wall that thermostat 1100 is mounted on. In some embodiments, thermostat 1100 measures the ambient reflected light reflected from a disparate wall or surface than the wall that thermostat 1100 is mounted on. Thermostat 1100 can measure the ambient reflected light by capturing the ambient reflected light with a light intensity sensor and converting the amount of ambient light into a numerical value. By way of example, a well-lit, bright surface could be measured as value "FFFF hex", while a dim low light surface could be measured as value "0001 hex." Ambient reflected light measurements can be represented in other forms such as binary, octal, decimal or any other numeric base.

In step 1234, thermostat 1100 can determine, based on the ambient reflected light measurement, an intensity of the wall. Thermostat 1100 can maintain a list of known reflected light measurement values and corresponding intensity representations. By way of example, a reflected light measurement value of "FFFF hex" could be stored as "very bright" while a reflected light measurement value of "0001 hex" could be stored as "very dim." Thermostat 1100 can determine the intensity of the wall by matching the reflected light measurement value of step 1232 to a value in the list of known reflected light measurements.

In step 1236, thermostat 1100 can operate projector 1120 in response to determining the intensity. Thermostat 1100 can increase or decrease the brightness of the display based on the intensity of the wall determined in step 1234. In some embodiments, thermostat 1100 increases the brightness of the display for high intensities of the wall. Thermostat 1100 can increase the brightness of the display by providing more power to projector 1120 or through another means not here mentioned.

Figure 14:
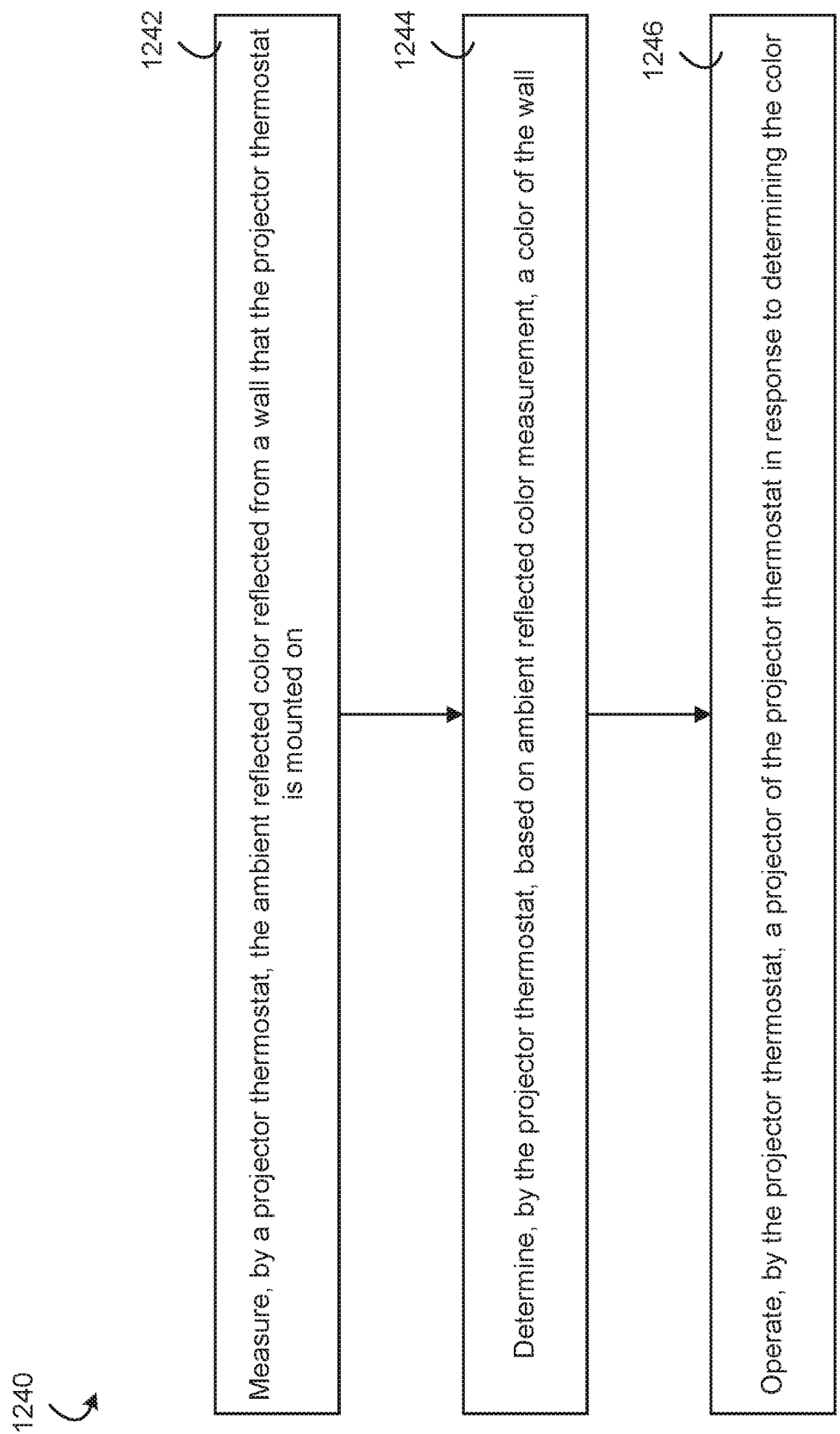
FIG. 14 is a flow diagram of a process for operating the thermostat of FIG. 11 via an ambient reflected color measurement, according to an exemplary embodiment.

Referring now to FIG. 14, a flow diagram of ambient color adjustment process 1240 that can be performed by thermostat 1100 as described with reference to FIG. 11 is shown, according to an exemplary embodiment. In some embodiments, ambient color adjustment process 1240 adjusts the display color scheme of thermostat 1100 to be easily viewed by a user. By way of example, ambient color adjustment process 1240 could select a contrasting color scheme for a room with a neutral projection surface. Thermostat 1100 as described with reference to FIG. 11 can be configured to perform the process 1240. Furthermore, thermostat 400 as described with reference to FIG. 4 can be configured to perform the process 1240. Any computing device as described herein can be configured to perform the process 1240.

In step 1242, thermostat 1100 can measure the ambient reflected color reflected from a wall that thermostat 1100 is mounted on. In some embodiments, thermostat 1100 can measure the ambient reflected color reflected from a disparate wall or surface than the wall that thermostat 1100 is mounted on. Thermostat 1100 can measure the ambient reflected color by capturing the ambient reflected color with a color sensor and converting the captured ambient reflected color into a numerical value. By way of example, a red surface could be measured as value "FFFF hex", while a blue surface could be measured as value "0001 hex." Ambient reflected color measurements can be represented in other forms such as binary, octal, decimal or any other numeric base. Thermostat 1100 can measure the ambient reflected color by any other means.

In step 1244, thermostat 1100 can determine, based on the ambient reflected color measurement, a color of the wall. Thermostat 1100 can maintain a list of known reflected color measurement values and corresponding color representations. By way of example, a reflected color measurement value of "FFFF hex" could be stored as "red" while a reflected color measurement value of "0001 hex" could be stored as "blue." Thermostat 1100 can determine the color of the wall by matching the reflected color measurement value of step 1242 to a value in the list of known reflected color measurements.

In step 1246, thermostat 1100 can operate projector 1120 in response to determining the color. Thermostat 1100 can change the color of the display based on the color of the wall determined in step 1244. In some embodiments, thermostat 1100 uses a high contrast display dark colored walls. Thermostat 1100 can store several color schemes and select between stored color schemes based on the color of the wall. By way of example, thermostat 1100 could use a color scheme based on dark blue and eggshell white for a dark blue wall.

Figure 15:
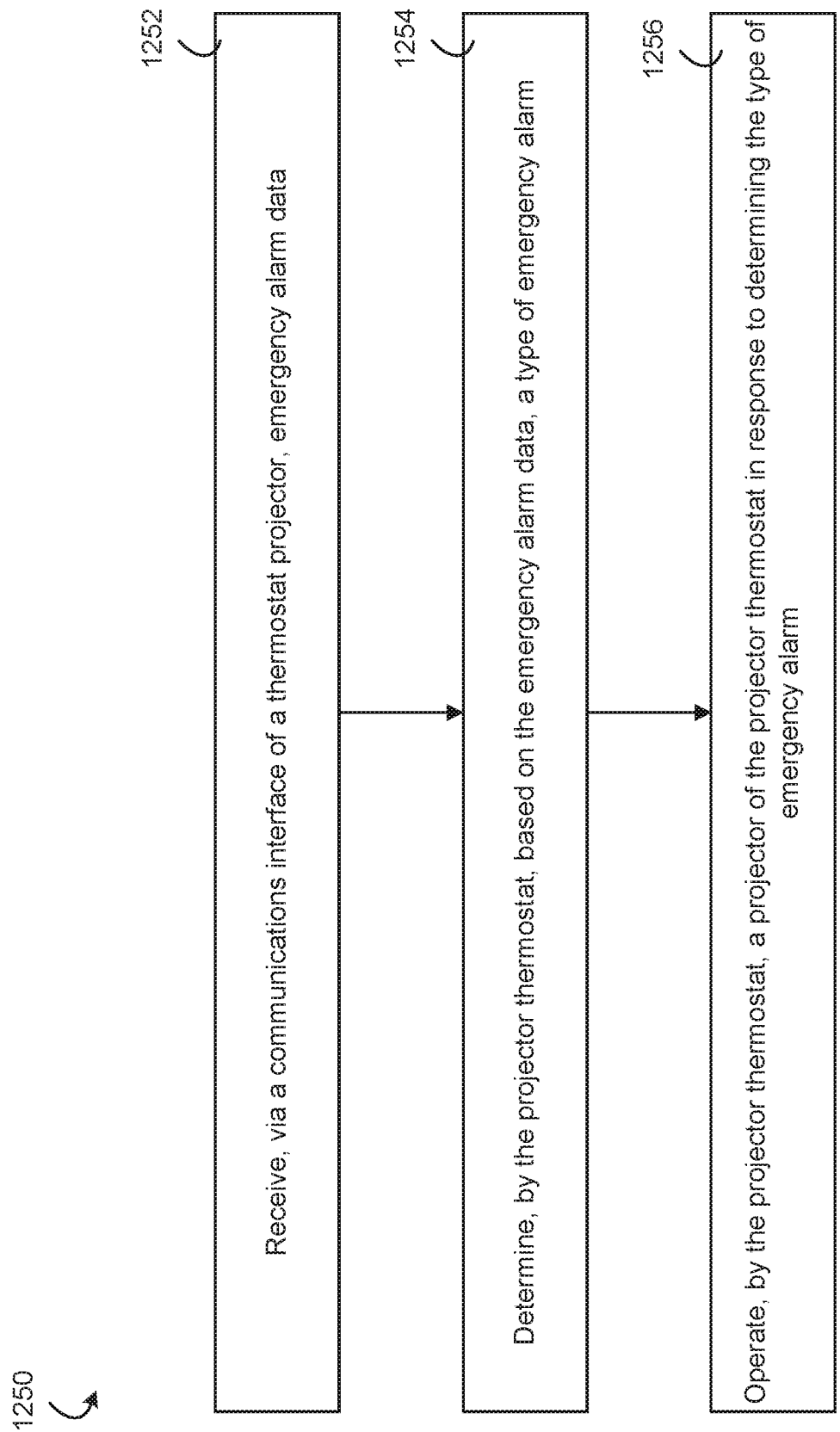
FIG. 15 is a flow diagram of a process for operating the thermostat of FIG. 11 via received emergency alarm data, according to an exemplary embodiment.

Referring now to FIG. 15, a flow diagram of emergency alarm process 1250 that can be performed by thermostat 1100 as described with reference to FIG. 11 is shown, according to an exemplary embodiment. In some embodiments, emergency alarm process 1250 occurs in response to receiving emergency alarm data. Emergency alarm process 1250 can provide emergency information to a user. In some embodiments, emergency alarm process 1250 enables an "emergency mode" or other operational mode to provide information to a user. In some embodiments, emergency alarm process 1250 causes thermostat 1100 to control external devices such as sprinklers, lights, speakers or any other device. By way of example, in the event of a fire alarm thermostat 1100 could cause a smart speaker to play evacuation instructions. Thermostat 1100 as described with reference to FIG. 11 can be configured to perform the process 1250. Furthermore, thermostat 400 as described with reference to FIG. 4 can be configured to perform the process 1250. Any computing device as described herein can be configured to perform the process 1250.

In step 1252, thermostat 1100 can receive emergency alarm data via communication interface 1130. Emergency alarm data may be a weather report, smoke detection, financial indicator, news report, carbon monoxide detection, amber alert, emergency alert system data, or other data not here mentioned. Thermostat 1100 can receive emergency alarm data via a Wi-Fi network, a wired Ethernet network, a Zigbee network, a Bluetooth network, and/or any other means known in the art. In some embodiments, thermostat 1100 receives emergency alarm data from another source not here mentioned.

In step 1254, thermostat 1100 can determine, based on the emergency alarm data, a type of emergency alarm. In some embodiments, the emergency alarm data is configured to easily provide an alarm type as a data structure, tag, or by another means not here mentioned. Thermostat 1100 can parse the emergency alarm data for an emergency alarm type. In some embodiments, thermostat 1100 can determine the type of emergency alarm based on the source of the emergency alarm data. By way of example, thermostat 1100 could determine a fire alarm emergency type from emergency alarm data received from a smoke detector.

In step 1256, thermostat 1100 can operate projector 1120 in response to determining the type of emergency alarm. In some embodiments, thermostat 1100 displays customized emergency response information to a user through projector 1120. Thermostat 1100 can maintain a list of emergency response procedures associated with different emergency alarm types and display the corresponding emergency response procedure associated with the present emergency alarm type. The emergency response procedure can be customized to the location. By way of example, thermostat 1100 could display an evacuation map for the building experiencing a fire alarm emergency alarm type.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller configured to provide a display, the controller comprising: a projector configured to project light for a user interface, wherein the projector is located on a first side of a surface; a waveguide configured to transmit the light from the projector to a second side of the surface; Wherein the waveguide is located perpendicular to the surface; and a direction element located on the second side of the surface, wherein the direction element is configured to direct the light from the projector to a user.

2. The controller of claim 1, wherein the waveguide is configured to transmit the light from the projector through a opening in the surface in a first direction; wherein the direction element is configured to direct the light from the projector by redirecting the light in a second direction onto the surface.

3. The controller of claim 1, wherein the waveguide is configured to transmit the light from the projector in a first direction;
   wherein the direction element is configured to direct the light from the projector by redirecting the light in a second direction onto a diffraction grating;
   wherein the diffraction grating is configured to direct the light from the direction element by redirecting the light in a third direction to the user.

4. The controller of claim 1, wherein the waveguide is configured to transmit the light from the projector through a opening in the surface in a first direction; wherein the direction element is configured to direct the light from the projector by redirecting the light onto a projection surface; wherein the projection surface is configured to direct the light from the direction element to the user.

5. The controller of claim 1, wherein the waveguide is configured to transmit the light from the projector through a opening in the surface in a first direction; wherein the direction element is configured to direct the light from the projector by redirecting the light in a second direction onto a combiner surface; wherein the combiner surface is configured to direct the light from the direction element by redirecting the light in a third direction to the user.

6. The controller of claim 1, wherein the controller further comprises a light sensor configured to sense an ambient light intensity of the surface; wherein the controller further comprises a processing circuit configured to: receive a sensed input value from the light sensor; update a brightness of the user interface based on the ambient light intensity of the surface.

7. The controller of claim 1, wherein the controller further comprises a color sensor configured to sense a color of the surface; wherein the controller further comprises a processing circuit configured to: receive a sensed input value from the color sensor; update a color scheme of the user interface based on the color of the surface.

8. The controller of claim 1, wherein the controller further comprises a processing circuit configured to:
   receive emergency data associated with an emergency event;
   determine whether the emergency event exists based on the received emergency data;

update the user interface to include an indication of the emergency event in response to a determination that the emergency event exists.

9. The controller of claim 1, wherein the controller further comprises a processing circuit configured to:
determine whether a state of the controller is a lock state or an unlocked state;
cause the projector to project light for a lock screen in response to a determination that the controller is in the lock state;
ignore user inputs from a user input device in response to the determination that the controller is operating in the lock state;
receive a credential from the user input device;
determine whether the credential grants the user access to the controller;
cause the controller to operate in the unlocked state;
cause the projector to project light for a control screen;
receive one or more user inputs from the user input device in response to a determination that the credential grants the user access to the controller.

10. A device with a projected display for controlling building equipment, the device comprising:
a waveguide or a projection surface configured to be disposed between a user and a front of a mounting surface for the device; and
a projector, configured to:
generate a user display for controlling or monitoring the building equipment from a source element, wherein the source element is located behind the mounting surface for the device and provides the user display at a first image size;
present the user display to a user via at least one of the projection surface or the waveguide at a second image size larger than the first image size.

11. The device of claim 10, wherein the device further includes a processing circuit configured to:
determine whether a state of the device is a lock state or an unlocked state;
cause the projector to project light for a lock screen in response to a determination that the device is in the lock state;
receive a credential from a user input device;
determine whether the credential grants the user access to the device;
cause the device to operate in the unlocked state;
cause the projector to project light for a control screen;
receive one or more user inputs from the user input device in response to a determination that the credential grants the user access to the device.

12. A building management system comprising:
one or more sensors;
a display device with a projected display of HVAC information, the display device comprising:
a waveguide or a projection surface configured to be disposed between a user and a mounting surface for the display device;
a projector, configured to:
generate a user display from a source element, wherein the source element is located behind a mounting surface that the display device is mounted on and provides the user display at a first image size;
present the user display to a user on a front of the mounting surface via at least one of the projection surface or the waveguide at a second image size larger than the first image size.

13. The building management system of claim 12, wherein the building management system further includes a processing circuit configured to:
determine whether a state of the display device is a lock state or an unlocked state;
cause the projector to project light for a lock screen in response to a determination that the display device is in the lock state;
receive a credential from a user input device;
determine whether the credential grants the user access to the display device;
cause the display device to operate in the unlocked state;
cause the projector to project light for a control screen;
receive one or more user inputs from the user input device in response to a determination that the credential grants the user access to the display device.

14. The building management system of claim 13, wherein the credential is received from at least one of a wearable pendant, a smart phone, a smart watch, or a tablet.

* * * * *